US011892670B2

(12) United States Patent
Nakabayashi et al.

(10) Patent No.: US 11,892,670 B2
(45) Date of Patent: *Feb. 6, 2024

(54) LIGHT EMITTING MODULE AND PLANAR LIGHT SOURCE

(71) Applicant: NICHIA CORPORATION, Anan (JP)

(72) Inventors: Takuya Nakabayashi, Tokushima (JP); Toru Hashimoto, Tokushima (JP); Keiji Emura, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,879

(22) Filed: Oct. 25, 2022

(65) Prior Publication Data

US 2023/0060023 A1 Feb. 23, 2023

Related U.S. Application Data

(63) Continuation of application No. 17/167,511, filed on Feb. 4, 2021, now Pat. No. 11,520,098.

(30) Foreign Application Priority Data

Feb. 7, 2020 (JP) .................................. 2020-019416
Oct. 7, 2020 (JP) .................................. 2020-169824

(51) Int. Cl.
*F21V 8/00* (2006.01)
*F21V 13/14* (2006.01)
(Continued)

(52) U.S. Cl.
CPC .......... *G02B 6/0021* (2013.01); *F21V 7/0091* (2013.01); *F21V 13/14* (2013.01);
(Continued)

(58) Field of Classification Search
CPC ......... G02F 1/133603; G02F 1/133605; G02F 1/133606; G02F 1/133607;
(Continued)

(56) References Cited

U.S. PATENT DOCUMENTS 7,582,915 B2 * 9/2009 Hsing Chen ....... G02B 19/0071
257/E33.072
8,301,002 B2 10/2012 Shani
(Continued)

FOREIGN PATENT DOCUMENTS

CN 108459433 A 8/2018
CN 207851344 U 9/2018
(Continued)

OTHER PUBLICATIONS

Notice of Allowance in U.S. Appl. No. 17/167,511, dated Aug. 3, 2022.
(Continued)

*Primary Examiner* — Peggy A Neils
*Assistant Examiner* — James M Endo
(74) *Attorney, Agent, or Firm* — Foley & Lardner LLP

(57) ABSTRACT

A light emitting module including: a light guide member including: an emission region defined by a sectioning groove, a light source placement part located in the emission region, and a light adjusting hole; and a light source disposed in the light source placement part. In the schematic top view: the light adjusting hole is not positioned on a first straight line connecting (i) a center of the light source and (ii) a point in the sectioning groove that is farthest from the center of the light source, and a first lateral face of the light adjusting hole has a first region, and a line normal to the first region is oblique to a second straight line connecting (i) the center of the light source and (ii) a point in the sectioning groove that is closest to the center of the light source.

22 Claims, 15 Drawing Sheets

(51) Int. Cl.
*F21Y 105/16* (2016.01)
*F21V 7/00* (2006.01)
*G02F 1/13357* (2006.01)

(52) U.S. Cl.
CPC ......... *F21Y 2105/16* (2016.08); *G02B 6/0038* (2013.01); *G02F 1/133603* (2013.01); *G02F 1/133605* (2013.01); *G02F 1/133606* (2013.01)

(58) Field of Classification Search
CPC ............ G02F 1/133611; G02B 6/0021; G02B 6/0038; F21V 7/0091; F21V 7/0066; F21V 7/0083; F21V 5/007; F21V 5/002; F21V 5/045; F21V 13/14; F21Y 2105/16
See application file for complete search history.

(56) References Cited

U.S. PATENT DOCUMENTS

| | | | |
|---|---|---|---|
| 8,368,637 | B2 | 2/2013 | Choi |
| 8,506,148 | B2* | 8/2013 | Shimizu ............... G02B 6/0021 362/97.3 |
| 11,520,098 | B2* | 12/2022 | Nakabayashi ....... G02B 6/0041 |
| 2004/0012027 | A1* | 1/2004 | Keller .................... H01L 33/50 257/79 |
| 2005/0265029 | A1 | 12/2005 | Epstein et al. |
| 2007/0147073 | A1 | 6/2007 | Sakai et al. |
| 2008/0137335 | A1* | 6/2008 | Tsai .................... G02B 6/0021 362/247 |
| 2008/0266875 | A1* | 10/2008 | Chang ............... G02F 1/133606 362/330 |
| 2009/0050911 | A1* | 2/2009 | Chakraborty ........... H01L 33/56 257/89 |
| 2009/0067176 | A1 | 3/2009 | Wang et al. |
| 2009/0128735 | A1 | 5/2009 | Larson et al. |
| 2009/0272996 | A1* | 11/2009 | Chakraborty ........... H01L 33/56 257/E33.061 |
| 2010/0046219 | A1 | 2/2010 | Pijlman et al. |
| 2010/0163898 | A1* | 7/2010 | Hung .................... H01L 33/507 257/E33.056 |
| 2010/0201916 | A1 | 8/2010 | Bierhuizen |
| 2011/0006316 | A1* | 1/2011 | Ing .................... G02F 1/133606 257/89 |
| 2011/0109839 | A1 | 5/2011 | Zhu et al. |
| 2011/0194034 | A1 | 8/2011 | Shimizu |
| 2012/0013811 | A1* | 1/2012 | Shimizu ............... G02B 6/0055 348/739 |
| 2012/0069579 | A1 | 3/2012 | Koh et al. |
| 2012/0275139 | A1 | 11/2012 | Chen et al. |
| 2014/0293648 | A1 | 10/2014 | Liu |
| 2017/0115531 | A1 | 4/2017 | Hiraka |
| 2018/0180249 | A1* | 6/2018 | Yamada ................. H01L 33/505 |
| 2018/0182940 | A1* | 6/2018 | Yamamoto ........... F21V 7/0083 |
| 2018/0239076 | A1* | 8/2018 | Chen .................... G02B 6/0068 |
| 2018/0335559 | A1 | 11/2018 | Cho |
| 2018/0356685 | A1 | 12/2018 | Jang et al. |
| 2019/0278016 | A1 | 9/2019 | Xiao |
| 2019/0294005 | A1* | 9/2019 | Imada .................. G02B 6/0026 |
| 2020/0049877 | A1 | 2/2020 | Watanabe et al. |

FOREIGN PATENT DOCUMENTS

| | | |
|---|---|---|
| JP | 2007-329114 A | 12/2007 |
| JP | 2008-503034 A | 1/2008 |
| JP | 2008-059786 A | 3/2008 |
| JP | 2010-541154 A | 12/2010 |
| JP | 2018-137212 A | 8/2018 |
| KR | 20090117419 A | 11/2009 |
| WO | WO-2018/116815 A1 | 6/2018 |

OTHER PUBLICATIONS

U.S. Office Action in U.S. Appl. No. 17/167,511, dated Aug. 4, 2021.

U.S. Office Action in U.S. Appl. No. 17/167,511, dated Dec. 17, 2021.

* cited by examiner

LIGHT EMITTING MODULE AND PLANAR LIGHT SOURCE

CROSS-REFERENCE TO RELATED APPLICATIONS

This application is a continuation of U.S. patent application Ser. No. 17/167,511, filed on Feb. 4, 2021, which claims priority to Japanese Patent Application No. 2020-019416, filed on Feb. 7, 2020, and Japanese Patent Application No. 2020-169824, filed on Oct. 7, 2020. The disclosures of these applications are hereby incorporated by reference in their entireties.

BACKGROUND

The present disclosure relates to light emitting modules and planar light sources.

Planar light sources that employ light sources and light guide members have been used as backlights for liquid crystal displays. For planar light sources, techniques for sectioning an emission face into multiple emission regions and controlling the luminance per emission region have been developed. See, for example, Japanese Patent Publication No. 2008-59786. There is a need to reduce luminance non-uniformity in each emission region.

SUMMARY

One of the objects of certain embodiments of the present invention is to provide a light emitting module and a planar light source in which luminance non-uniformity in emission regions is reduced.

A light emitting module includes: a light guide member comprising: an emission region defined by a sectioning groove, a light source placement part located in the emission region, and a light adjusting hole, wherein, in a schematic top view, the light adjusting hole is located between the sectioning groove and the light source placement part; and a light source disposed in the light source placement part. In the schematic top view: the light adjusting hole is not positioned on a first straight line connecting (i) a center of the light source and (ii) a point in the sectioning groove that is farthest from the center of the light source, the light adjusting hole has a first lateral face located on a side closer to the light source and a second lateral face located on a side opposite the first lateral face, the first lateral face has a first region, and a line normal to the first region is oblique to a second straight line connecting (i) the center of the light source and (ii) a point in the sectioning groove that is closest to the center of the light source.

A light emitting module includes: a light guide member comprising: an emission region defined by a sectioning groove, a light source placement part located in the emission region, first light adjusting hole, and a second light adjusting hole, wherein, in a schematic top view, the first light adjusting hole and the second light adjusting hole are located between the sectioning groove and the light source placement part; and a light source disposed in the light source placement part, wherein: a refractive index of an inside of the second light adjusting hole is lower than a refractive index of the light guide member. In the schematic top view, a shape of the emission region is quadrilateral. The first light adjusting hole is not positioned on a first straight line connecting a center of the light source and a corner of the emission region where light emitted from the light source is totally reflected by a lateral face of the first light adjusting hole. The second light adjusting hole is positioned at a region with which the first straight line intersects where the light emitted from the light source is refracted in the second light adjusting hole.

A planar light source according to one embodiment includes the light emitting module described above and a wiring substrate. The light guide member is disposed on the wiring substrate. The light source is mounted on the wiring substrate.

According to the embodiments, a light emitting module and a planar light source in which luminance non-uniformity in emission regions is reduced can be provided.

BRIEF DESCRIPTION OF THE DRAWINGS

FIG. 1 is a schematic top view of a planar light source according to a first embodiment.

FIG. 2 is a schematic top view of an emission region of the planar light source according to the first embodiment.

FIG. 3 is a schematic cross-sectional view of the planar light source according to the first embodiment taken along line in FIG. 1.

FIG. 4 is a schematic top view of an emission region of a planar light source according to a second embodiment.

FIG. 5 is a schematic top view of an emission region of a planar light source according to a third embodiment.

FIG. 6 is a schematic top view of an emission region of a planar light source according to a fourth embodiment.

FIG. 7 is a schematic top view of an emission region of a planar light source according to a fifth embodiment.

FIG. 8 is a schematic top view of an emission region of a planar light source according to a sixth embodiment.

FIG. 9 is a schematic top view of an emission region of a planar light source according to a seventh embodiment.

FIG. 10 is a schematic top view of an emission region of a planar light source according to an eighth embodiment.

FIG. 11 is a schematic cross-sectional view of a planar light source according to a first variation.

FIG. 12 is a schematic cross-sectional view of a planar light source according to a second variation.

FIG. 13 is a schematic cross-sectional view of a planar light source according to a third variation.

FIG. 14 is a schematic cross-sectional view of a planar light source according to a fourth variation.

FIG. 15 is a schematic cross-sectional view of a planar light source according to a fifth variation.

FIG. 16 is a schematic cross-sectional view of a light emitting module according to a sixth variation.

FIG. 17A is a schematic cross-sectional view of a light source according to a seventh variation.

FIG. 17B is a schematic cross-sectional view of a light source according to an eighth variation.

FIG. 17C is a schematic cross-sectional view of a light source according to a ninth variation.

FIG. 18A is a schematic cross-sectional view of a light source according to a tenth variation.

FIG. 18B is a schematic cross-sectional view of a light source according to an eleventh variation.

FIG. 18C is a schematic cross-sectional view of a light source according to a twelfth variation.

DETAILED DESCRIPTION

First Embodiment

A first embodiment will be explained first.

Figure 1:
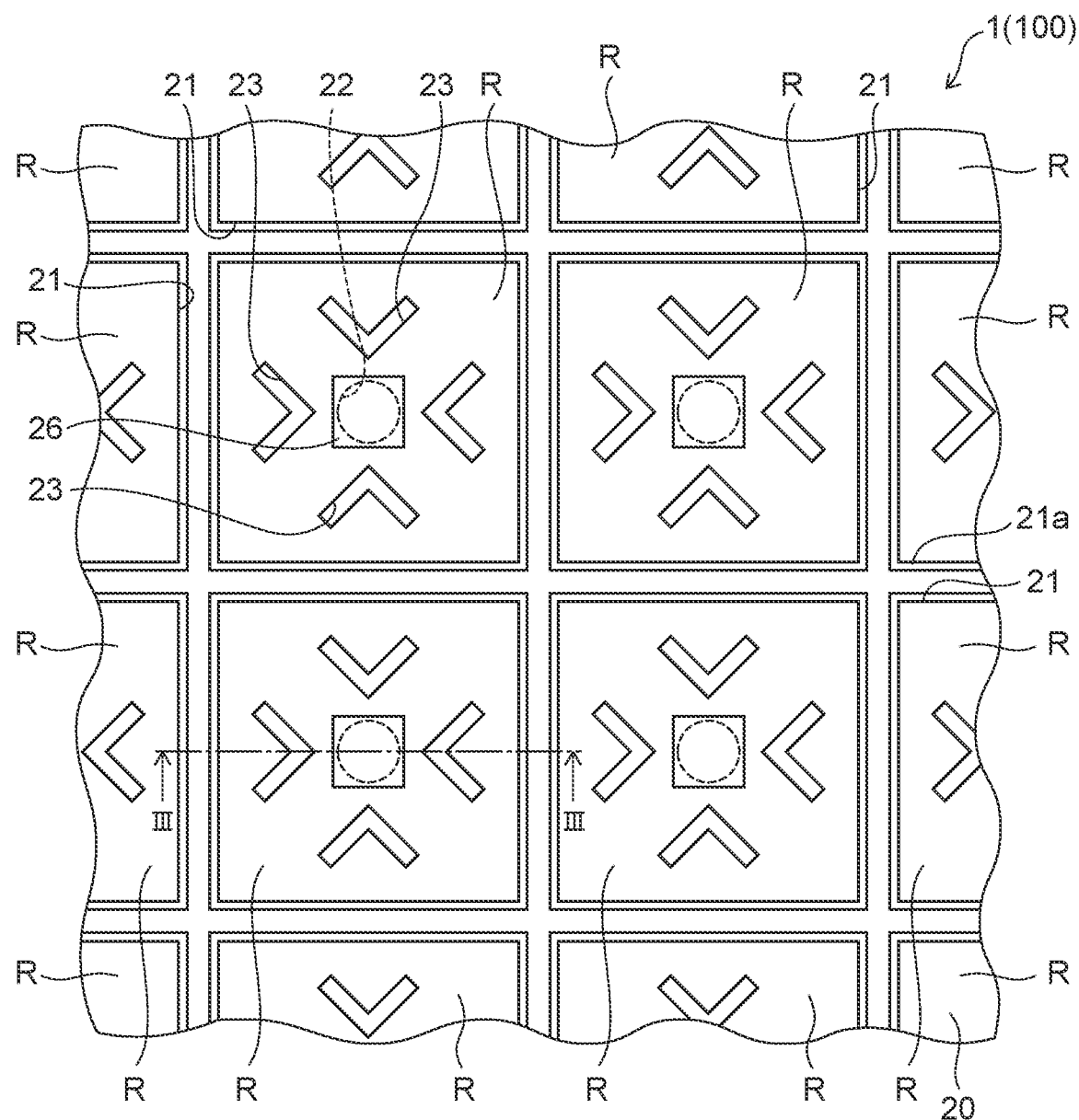
FIG. 1 is a top view of a planar light source according to the embodiment.
Figure 1:
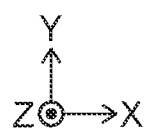
Figure 2:
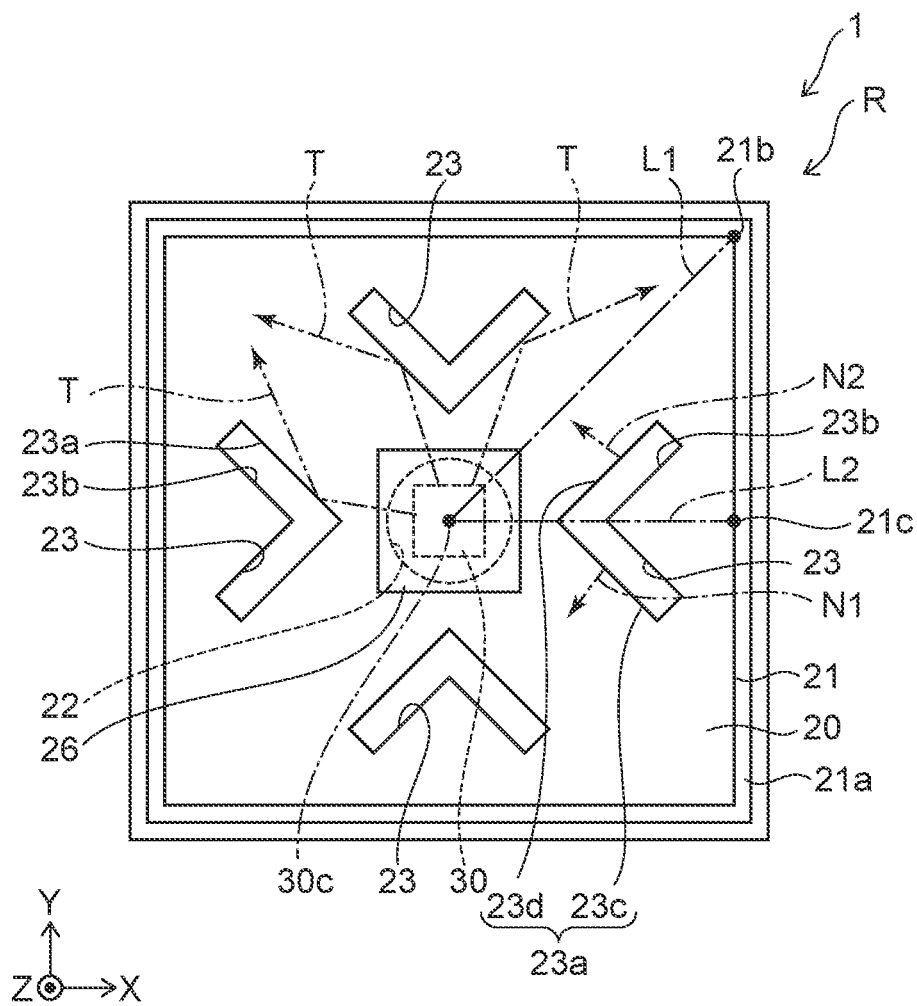
FIG. 2 is a top view of an emission region of the planar light source according to the embodiment.
Figure 3:
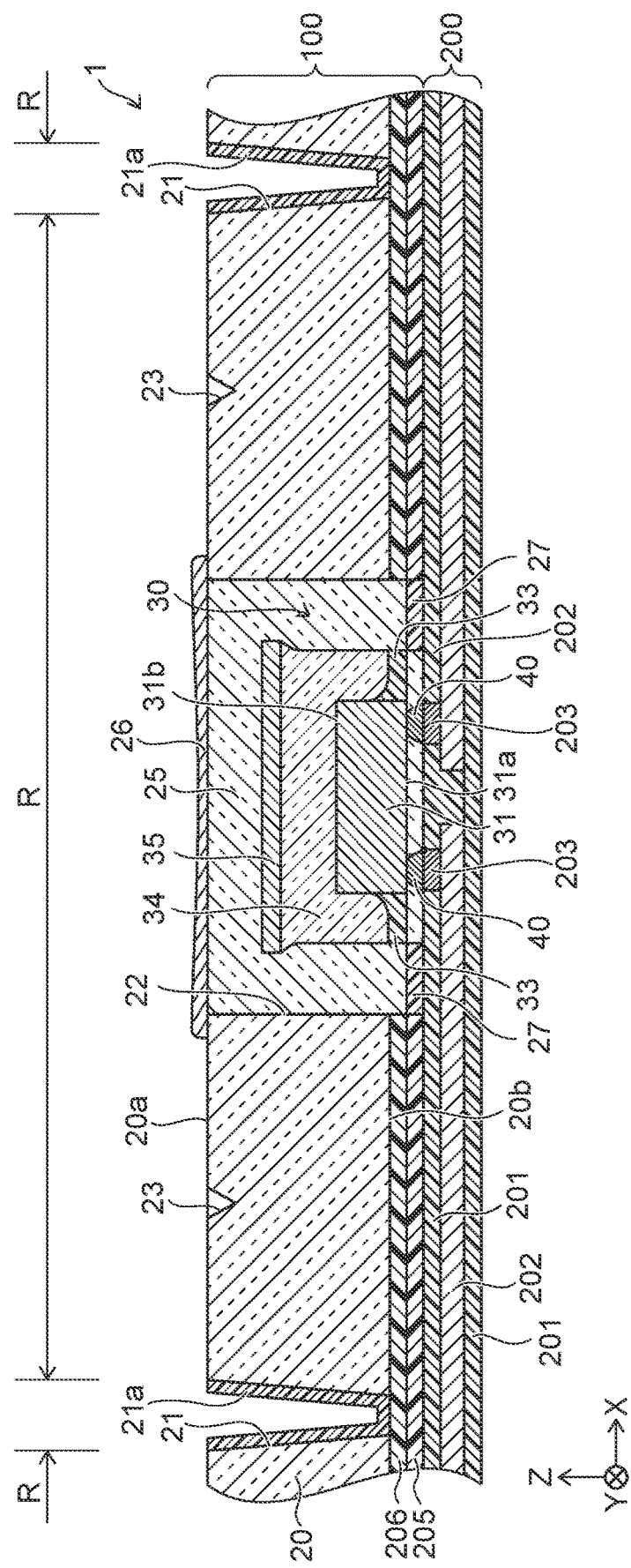
FIG. 3 is a cross-sectional view of the planar light source according to the embodiment taken along line in FIG. 1.

As shown in FIG. 1 to FIG. 3, the planar light source 1 according to the present embodiment has a wiring substrate 200, and a light emitting module 100 is disposed on the wiring substrate 200. In the light emitting module 100, a light guide member 20 and light sources 30 are disposed. The light guide member 20 is disposed on the wiring substrate 200, and the light sources 30 are mounted on the wiring substrate 200.

In the wiring substrate 200, a wiring layer 202 and a connection layer 203 that electrically connects the wiring layer 202 and the light sources 30 are provided in an insulating base material 201. In FIG. 3, only one wiring layer 202 is shown, but multiple wiring layers 202 can be disposed. An adhesive sheet 205 and a light reflecting sheet 206 are disposed between the wiring substrate 200 and the light guide member 20. The adhesive sheet 205 adheres the wiring substrate 200 and the light reflecting sheet 206. The light reflecting sheet 206 reflects a portion of the light emitted from a light source 30.

For the light reflecting sheet 206, a resin sheet containing a large number of air bubbles (e.g., foamed resin sheet), a resin sheet containing a light diffusing material, or the like can be used. For the resin used as the light reflecting sheet 206, a thermoplastic resin, such as an acrylic resin, polycarbonate resin, cyclic polyolefin resin, polyethylene terephthalate resin, or polyester resin, or a thermosetting resin, such as an epoxy resin or silicone resin, can be used. For the light diffusing material, any known appropriate material, such as titanium oxide, silica, alumina, zinc oxide, or glass, can be used.

On the upper face of the wiring substrate 200, a light reflecting layer having light reflectivity for the light emitted from the light sources 30 can further be disposed, and in this case, the adhesive layer 205 is adhered to the light reflecting layer. Alternatively, the light reflecting layer can be disposed between the light guide member 20 described later and the light reflecting sheet 206, for example, on the upper face of the light reflecting sheet 206. This allows the light reflecting layer to scatter a portion of the light that is emitted from the light sources 30 and propagates in the light guide member 20, thereby facilitating the extraction of light from the upper face of the light guide member 20. Such a light reflecting layer can have a film or dot shape. The light reflecting layer can extend into the light source placement parts 22 of the light guide member 20 described later when viewed from above. Preferably, the light reflecting layer is extended to the positions that overlap the light sources 30 when viewed from above, i.e., between the light sources 30 and the wiring substrate 200. This can hinder the wiring substrate 200 from absorbing a portion of the light emitted from the light sources 30, thereby moderating the luminance decline around the light sources 30.

For the light reflecting layer, for example, a resin containing any known appropriate light diffusing material, such as titanium oxide, silica, alumina, zinc oxide, or glass, can be used. For the resin used as the light reflecting layer, similarly to that used as the light reflecting sheet 206, a thermoplastic or thermosetting resin, for example, can be used. For the resin used as the light reflecting layer, a UV curable resin can alternatively be used.

The light guide member 20 is formed of a light transmissive material, and is plate shaped, for example. For the material used as the light guide member 20, for example, a thermoplastic resin, such as an acrylic resin, polycarbonate resin, cyclic polyolefin resin, polyethylene terephthalate resin, or polyester resin, a thermosetting resin, such as an epoxy resin or silicone resin, or glass can be used. In the light guide member 20, sectioning grooves 21, and emission regions R defined by the sectioning grooves 21 (i.e., the sectioning grooves 21 section the emission regions R), light source placement parts 22 positioned in the emission regions R, and light adjusting holes 23 each provided between the light source placement parts 22 and corresponding one of the sectioning grooves 21 when viewed from above are formed. The thickness of the light guide member 20, for example, is preferably 200 μm to 800 μm.

In the present disclosure, for the purpose of explanation, an XYZ orthogonal coordinate system is employed. The direction in which the wiring substrate 200 and the light guide member 20 are layered is denoted as the "Z direction" and the directions in which the emission regions R are arrayed are denoted as the "X direction" and the "Y direction." With respect to the Z direction, the direction from the wiring substrate 200 to the light guide member 20 will also be denoted as the "upward direction" and the opposite direction will also be denoted as the "downward direction." These expressions, however, are used for the sake of convenience, and have nothing to do with the direction of gravity. Viewing of an object from the upper side will be expressed as "when viewed from above."

When viewed from above, the sectioning grooves 21 form a lattice shape extending in the X direction and the Y direction, individually surrounding the emission regions R. The formation of the sectioning grooves 21 is not limited to a lattice, as long as they can optically divide the emission regions R to a practically sufficient extent. For example, the sectioning grooves do not have to be provided at the lattice points. This allows the light from adjacent emission regions R to be collected in the regions including no sectioning groove, thereby preventing the corners of the emission regions R from becoming less luminous. The explanation will be given below using a single emission region R, that similarly applies to the other emission regions R.

The width of a sectioning groove 21, for example, can be set to about 5% at most of the width of an emission region R. In the case of disposing the sectioning member 21a described later in the sectioning groove 21, it is preferable to set the width of the sectioning groove 21 to make it easy to dispose the sectioning member 21a. The sectioning groove 21 can occupy any appropriate percentage of the light guide member 20 in the thickness direction (Z direction). For example, in the case of reducing light leakage between adjacent emission regions R, the sectioning groove 21 preferably occupies at least 50% of the thickness of the light guide member 20, more preferably at least 70%, particularly preferably at least 90%.

As will be explained later with reference to variations of the embodiment, each sectioning groove 21 can be formed on the upper face 20a or the lower face 20b of the light guide member 20, formed to pass through the light guide member 20 in the Z direction, formed as a shape in which a through groove is partially closed, or as a hollow space not reaching the upper face 20a or the lower face 20b of the light guide member 20. A hollow sectioning groove 21 can be formed, for example, by adhering together a light guide plate whose upper face has a groove and a light guide plate whose lower face has a groove by using a light transmissive adhesive sheet. The same material as that used for the light guide member 20 is preferably used for such an adhesive sheet so as to reduce a possibility that any interface between the layers is created. In the present embodiment, for example, each sectioning groove 21 is formed on the upper face 20a of the light guide member 20.

The inside of each sectioning groove 21 can be an air layer, or include a sectioning member 21a containing a light reflecting material. For the light reflecting material, for example, a metal or a resin containing a light diffusing material can be used. For the resin used as the light reflecting material, a thermoplastic resin, such as an acrylic resin, polycarbonate resin, cyclic polyolefin resin, polyethylene terephthalate resin, or polyester resin, or a thermosetting resin, such as an epoxy resin or silicone resin, can be used. For the light diffusing material, any known appropriate material, such as titanium oxide, silica, alumina, zinc oxide, or glass can be used. For the metal used as the light reflecting material, for example, platinum (Pt), silver (Ag), rhodium (Rh), or aluminum (Al) can be used. Each sectioning member 21a can be formed as a layer along the inner face of a sectioning groove 21, or can fill the sectioning groove 21 in whole or part. The upper part of the sectioning members 21a can protrude higher than the upper face 20a of the light guide member 20. In the present embodiment, for example, each sectioning member 21a in the form of a layer is disposed on the inner faces of the sectioning groove 21.

A light source placement part 22 is a space in which a light source 30 is disposed. In other words, the light source 30 is disposed in the light source placement part 22. As will be explained later with reference to variations of the embodiment, a light source placement part 22 can be a through hole passing through the light guide member 20 in the Z direction, or a recessed part formed on the lower face 20b of the light guide member 20. In the present embodiment, the shape of the light source placement part 22 is a circle when viewed from above, but can be, for example, an ellipse or a polygon, such as a triangle, quadrilateral, hexagon, or octagon.

In the present embodiment, for example, each light source placement part 22 is a through hole. A first light transmissive member 25 is provided in the light source placement part 22 so as to embed the light source 30 disposed therein. For the first light transmissive member 25, for example, a light transmissive resin material can be used. For the resin material, similarly to the light guide member 20, a thermoplastic resin or thermosetting resin can be used.

A first light adjusting member 26 is provided on the first light transmissive member 25. The first light adjusting member 26 reflects a portion while transmitting a portion of the light emitted from the light source 30 that transmitted through the first light transmissive member 25. The first light adjusting member 26 can be formed with, for example, a resin material containing a light diffusing material, or a metal material. For example, for the resin material, a silicone resin, epoxy resin, or a resin combining these can be used. For the light diffusing material, any known appropriate material, such as titanium oxide, silica, alumina, zinc oxide, or glass can be used. A dielectric multilayer film can alternatively be used for the first light adjusting member 26. In the present embodiment, for example, the first light adjusting member 26 is disposed in the form of a film, but can be disposed as dots. Moreover, the first light adjusting member 26 in the present embodiment covers the entire upper face of the first light transmissive member 25 when viewed from above, but a portion of the upper face of the first light transmissive member can be exposed from the first light adjusting member 26.

A first light reflecting member 27 in the form of a film is disposed at the bottom of each light source placement part 22, i.e., under the first light transmissive member 25. The first light reflecting member 27 is formed with a light reflecting material, such as a metal or a resin containing a light diffusing material, similarly to the light reflecting material contained in the sectioning member 21a.

Instead of the first light reflecting member 27, the light reflecting sheet 206 on the wiring substrate 200 can be extended into the light source placement part 22 of the light guide member 20 when viewed from above. In this case, preferably, the light reflecting sheet 206 is extended to a position overlapping the light source 30 when viewed from above, i.e., between the light source 30 and the wiring substrate 200. This can hinder the wiring substrate 200 from absorbing a portion of the light emitted from the light sources 30, thereby moderating the luminance decline around the light sources 30.

A light source 30 can be a light emitting element by itself, or a structure body in which a light emitting element and an optical member such as a wavelength conversion member are combined. As will be explained later with reference to variations of the embodiment, a light source 30 can take a variety of forms.

In the present embodiment, each light source 30 includes a light emitting element 31, a cover member 33, a second light transmissive member 34, and a second light adjusting member 35. The light emitting element 31 at least includes a semiconductor layers and a pair of positive and negative electrodes. The light emitting element 31, for example, is a light emitting diode (LED), and emits, for example, blue light. A semiconductor structure can include, for example, $In_xAl_yGa_{1-x-y}N$ (0≤x, 0≤y, x+y≤1). The light emitting element 31 has a first face 31a on which a pair of positive and negative electrodes is disposed, and a second face 31b that opposes the first face 31a.

In the semiconductor structure body of a light emitting element 31, a light emitting diode structure body is achieved by stacking at least a p-type semiconductor layer, an emission layer, and an n-type semiconductor layer, for example. The structure body of the emission layer can be one having a single active layer, such as a double heterostructure body and single quantum well (SQW) structure body, or one having a group of active layers such as a multi-quantum well (MQW) structure body. The emission layer can emit visible light or ultraviolet light. Examples of visible light include at least blue light to red light. A semiconductor structure body that includes such an emission layer can include, for example, $In_xAl_yGa_{1-x-y}N$ (0≤x, 0≤y, x+y≤1).

The light emitting element 31 can include two or more emission layers in the semiconductor structure body. For example, the semiconductor structure body can be one that includes two or more emission layers between an n-type semiconductor layer and a p-type semiconductor layer, or one formed by repeating two or more structure bodies each successively stacking an n-type semiconductor layer, an emission layer, and a p-type semiconductor layer. Two or more emission layers can include those that emit light of different colors or the same color. The same emission color can be a range of emission colors that can be deemed as the same for the purpose of use, and for example, there can be variation of about several nanometers in the dominant wavelength of each emission color. A combination of emission colors can be suitably selected. Examples of color combinations in the case of two emission layers include blue light and blue light, green light and green light, red light and red light, ultraviolet light and ultraviolet light, blue light and green light, blue light and red light, green light and red light, or the like.

The cover member 33, for example, is a resin material containing a light diffusing material, and is disposed in the surrounding of the lower part of the light emitting element 31. Specifically, for the cover member 33, a silicone or epoxy resin containing a light diffusing material, such as titanium oxide, silica, alumina, zinc oxide, or glass can be used. A planar light source 1 is provided with a bonding material 40 such as solder. The bonding material 40 connects the pair of positive and negative electrodes of the light emitting element 31 to the connection layer 203 of the wiring substrate 200, but can connect to the wiring layer 202 without via the connection layer 203.

The second light transmissive member 34 is disposed on the upper part of, around and above the light emitting element 31. The second light transmissive member 34 is formed of a light transmissive resin material that can contain a phosphor, but does not have to contain. For the resin material used as the second light transmissive member 34, for example, an epoxy resin, silicone resin, or a resin mixing these can be used. In the case in which the second light transmissive member 34 contains a phosphor, the second light transmissive member 34 serves as a wavelength conversion layer.

For the phosphors, yttrium aluminum garnet-based phosphors (e.g., $Y_3(Al,Ga)_5O_{12}$:Ce), lutetium aluminum garnet-based phosphors (e.g., $Lu_3(Al,Ga)_5O_{12}$:Ce), terbium aluminum garnet-based phosphors (e.g., $Tb_3(Al,Ga)SO_{12}$:Ce), β-SiAlON phosphors (e.g., $(Si,Al)_3(O,N)_4$:Eu), α-SiAlON phosphors (e.g., $Mz(Si,Al)_{12}(O,N)_{16}$ where $0<z≤2$ and M is an element selected from the group consisting of Li, Mg, Ca, Y, and lanthanide elements excluding La and Ce), nitride-based phosphors, such as CASN-based phosphors (e.g., $CaAlSiN_3$:Eu) or SCASN-based phosphors (e.g., $(Sr,Ca)AlSiN_3$:Eu), fluoride-based phosphors, such as KSF-based phosphors (e.g., $K_2SiF_6$:Mn) or MGF-based phosphors (e.g., $3.5MgO·0.5MgFr·GeO_2$:Mn), or quantum dot phosphors can be used.

The second light transmissive member 34 can contain several types of phosphors. For example, containing a phosphor that absorbs blue light and emits yellow light and a phosphor that absorbs blue light and emits red light allows the light source 30 to emit white light. The second light transmissive member 34 can contain a light diffusing material to the extent not to shield light. The content of the light diffusing material in the second light transmissive member 34 can be adjusted such that the transmittance of the second light transmissive member 34 for the light emitted from the light emitting element 31 is 50% to 99%, preferably 70% to 90%. For the light diffusing material, for example, titanium oxide, silica, alumina, zinc oxide, or glass can be used.

The second light adjusting member 35 is disposed on the upper face of the second light transmissive member 34. The second light adjusting member 35, similarly to the first light adjusting member 26, is formed with a light reflecting material, such as a metal or a resin material containing a light diffusing material. The second light adjusting member 35 reflects a portion and transmits a portion of the light entering from the second light transmissive member 34. In the case in which the transmittance of the second light adjusting member 35 for the light emitted from the light emitting element 31 is sufficiently low, for example, 1% to 50%, preferably 3% to 30%, the second light adjusting member 35 serves as a light shielding film, preventing the luminance immediately above the light source 30 from becoming excessively high.

Each light adjusting hole 23, similar to the sectioning grooves 21, can be formed on the upper face 20a or the lower face 20b of the light guide member 20, formed to pass through the light guide member 20 in the Z direction, formed as a shape in which a through hole is partially closed, or as a hollow space not reaching the upper face 20a or the lower face 20b of the light guide member 20. In the present embodiment, for example, each light adjusting hole 23 is formed on the upper face 20a of the light guide member 20. In other words, the light adjusting holes 23 reach the upper face 20a of the light guide member 20, but are positioned apart from the lower face 20b of the light guide member 20.

In the present disclosure, the term, "hole," is a general designation for a recessed part and a through hole. In other words, a "hole" can be a recessed part that does not pass through the body (e.g., the light guide member 20) in which it is created, or a through hole that passes through the body. Furthermore, the shape of a "hole" is not limited. In other words, it includes a high aspect ratio shape such as a groove extending in one direction when viewed from above, a low aspect ratio shape such as a circular or polygonal shape when viewed from above, and any other regular or irregular shape therebetween. Moreover, the internal structure of a "hole" can also be appropriately selected. In other words, a "hole" includes one having an air layer inside, one having a certain member intentionally provided therein, and one in which an unintended substance has been entered.

Each light adjusting hole 23 can occupy any percentage in the thickness direction of the light guide member 20. For example, in the case of increasing the amount of the light emitted from the light source 30 that advances towards the corners of the emission region R, the light adjusting holes 23 preferably occupy at least 15%, more preferably at least 25%, particularly preferably at least 50% of the thickness of the light guide member 20.

The inside of each light adjusting hole 23 can be an air layer, or include a light transmissive material or light reflecting material disposed therein. In the case in which a light transmissive material is disposed inside the light adjusting hole 23, the refractive index of the light transmissive material is preferably lower than the refractive index of the light guide member 20. Examples of resins for use as the light transmissive material or light reflecting material include thermoplastic resins, such as an acrylic resin, polycarbonate resin, cyclic polyolefin resin, polyethylene terephthalate resin, or polyester resin, or thermosetting resins, such as an epoxy resin or silicone resin. Moreover, the light transmissive material or light reflecting material can contain a light diffusing material. For the light diffusing material, any known appropriate material, such as titanium oxide, silica, alumina, zinc oxide, or glass can be used. For the metal used as the light reflecting material, for example, platinum (Pt), silver (Ag), rhodium (Rh), or aluminum (Al) can be used. The light transmissive material or light reflecting material can be provided in the form of a layer along the inner face of a light adjusting hole 23, or can fill the light adjusting hole 23 in whole or part. In the present embodiment, for example, the inside of each light adjusting hole 23 is an air layer. Thus, the refractive index of the inside of each light adjusting hole 23 is lower than the refractive index of the light guide member 20. The planar arrangement of the light adjusting holes 23 will be explained next.

For the purpose of explanation, an imaginary first straight line L1 and an imaginary second straight line L2 are established in the emission region R. A first straight line L1 is a straight line connecting the center 30c of the light source 30 and a farthest point 21b in the sectioning groove 21 that is farthest from the center 30c of the light source 30, when viewed from above. A second straight line L2 is a straight line connecting the center 30c of the light source 30 and a closest point 21c in the sectioning groove 21 that is closest from the center 30c of the light source 30, when viewed from above.

The "center of the light source" is a geometric center when viewed from above, and in the case in which the shape of the light source 30 is quadrilateral, for example, the center 30c is the intersection of the diagonal lines of the light source 30. "A farthest point 21b in the sectioning groove that is farthest from the center of the light source" means a point in the sectioning groove 21 (i.e., sectioning groove surrounding the light source 30) that is farthest from the center 30c of the light source 30, where other sectioning grooves 21 surrounding only other light sources 30 are not taken into consideration. In the case in which the shape of the emission region R is quadrilateral, a farthest pint 21b is a corner of the sectioning groove 21. In the case in which the shape of the emission region R is quadrilateral and the center 30c of the light source 30 coincides with the center of the emission region R when viewed from above, there are four first straight lines L1 and four second straight lines L2.

The light adjusting holes 23 are not positioned on any first straight line L1. In the present embodiment, the light adjusting holes 23 intersect with the second straight lines L2. The shape of each emission region R is quadrilateral when viewed from above, and the light adjusting holes 23 are provided such that one light adjusting hole is positioned between the light source 30 and each side of the emission region R.

When viewed from above, each light adjusting hole 23 is V-shaped, and the bent part protrudes towards the light source 30. Each light adjusting hole 23 has a first lateral face 23a positioned closer to the light source 30, and a second lateral face 23b positioned opposite side of the first lateral face 23a. The first lateral face 23a has a first region 23c and a second region 23d. The second region 23d is oblique to the first region 23c. The normal line N1 normal to the first region 23c and the normal line N2 normal to the second region 23d are both oblique to a second straight line L2. The direction in which the second region 23d is oblique to the second straight line L2 is opposite to the direction in which the first region 23c is oblique to the second straight line L2. For example, the shape of the light adjusting hole 23 has line symmetry using the second straight line L2 as the axis of symmetry.

The width of such a light adjusting hole 23, for example, can be set to about 1% to 5%, more preferably about 1.5% to 3% of the width of the emission region R. In the case of disposing the light transmissive material or light reflecting material described later in the light adjusting holes 23, the width of each light adjusting hole 23 is preferably set so that such a material is easily provided. The width of a light adjusting hole 23 here is the shortest distance between the first lateral face 23a and the second lateral face 23b when viewed from above.

The operation of the planar light source according to the present embodiment will be explained next.

FIG. 2 shows several examples of optical paths T.

When power is supplied to the light source 30 via the wiring substrate 200, the light source 30 emits light. The light emitted from the light source 30, introduced into the light guide member 20 via the first light transmissive member 25, propagates in the light guide member 20 while being reflected by the upper face 20a and the lower face 20b of the light guide member 20.

A portion of the light propagating in the light guide member 20 reaches the light adjusting holes 23. Because the refractive index of the inside of each light adjusting hole 23 is lower than the refractive index of the light guide member 20, depending on the angles of incidence on the first region 23c and the second region 23d of the first lateral face 23a, the light is totally reflected by the first region 23c and the second region 23d. A portion of the totally reflected light advances towards the corners of the emission region R. This allows the light, that would have passed the locations of the light adjusting holes 23 if absent, to be totally reflected by the light adjusting holes 23 to advance towards the corners of the emission region R. This, as a result, increases the brightness in the corners of the emission region R, thereby reducing luminance non-uniformity in the emission region R. Once the light reaches the sectioning groove 21, further propagation is obstructed by the sectioning groove 21. This hinders the light from leaking into adjacent emission regions R.

The effect of the embodiment will be explained next.

In the present embodiment, sectioning grooves 21 are formed in the light guide member 20 to section the emission face of the light emitting module 100 into a plurality of emission regions R. In the emission regions R, light source placement parts 22 are respectively formed where light sources 30 are respectively disposed. The majority of the light emitted from the light sources 30 exits through the upper face 20 of the light guide member 20 before reaching the sectioning grooves 21. Accordingly, the majority of the light emitted by a light source 30 exits the light emitting module 100 from the emission region R in which the light source 30 is disposed. This makes it possible to control the luminous intensity per emission region R. As a result, a high contrast image can be displayed when a planar light source according to the embodiment is used as a light source for a liquid crystal display, for example.

In the present embodiment, moreover, light adjusting holes 23 are formed in the light guide member 20, and light can be totally reflected by the light adjusting holes 23. Because the corners of the emission regions R are distant from the light sources 30, the corners of the emission regions R are more likely to be dark in the absence of light adjusting holes 23.

Accordingly, in the present embodiment, light adjusting holes 23 are formed in the positions apart from the first straight lines L1, for example, in the positions intersecting with the second straight lines L2. This allows a portion of the light propagating near the second straight lines L2 to be totally reflected by the light adjusting holes 23 to advance towards the first straight lines L1. This can increase the brightness in the corners of the emission regions R, thereby reducing luminance non-uniformity in each emission region R.

Second Embodiment

A second embodiment will be explained next.

Figure 4:
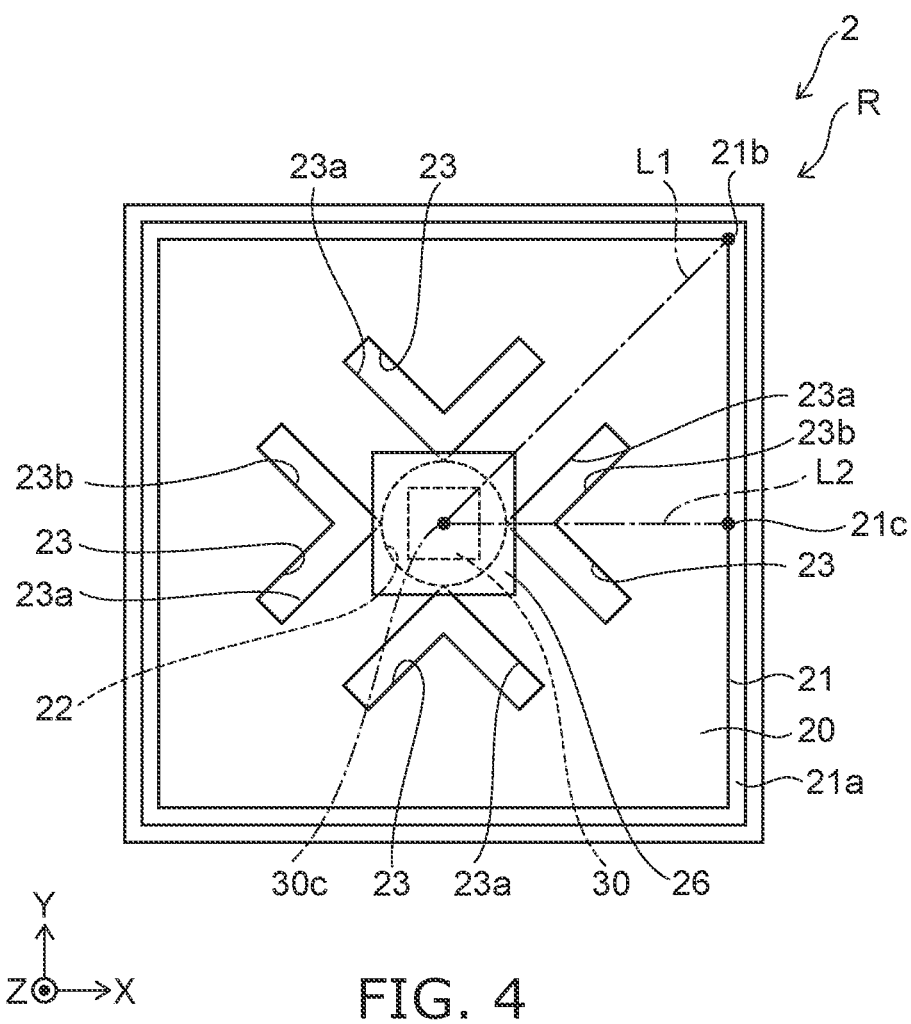

FIG. 4 is a top view of an emission region of a planar light source according to the present embodiment.

As shown in FIG. 4, in the planar light source 2 according to the present embodiment, the first lateral face 23a of each light adjusting hole 23 is in contact with the light source placement part 22. The second lateral face 23b of each light adjusting hole 23 is positioned apart from the sectioning groove 21. This can also achieve a similar effect to that achieved by the first embodiment. In the present embodiment, in particular, the light adjusting holes 23 disposed near the light source 30 can increase the amount of the light from the light source 30 that is totally reflected towards the corners of the emission region R. The other elements not described above, the operation, and the effect of the present embodiment are similar to those of the first embodiment.

Third Embodiment

A third embodiment will be explained next.

Figure 5:
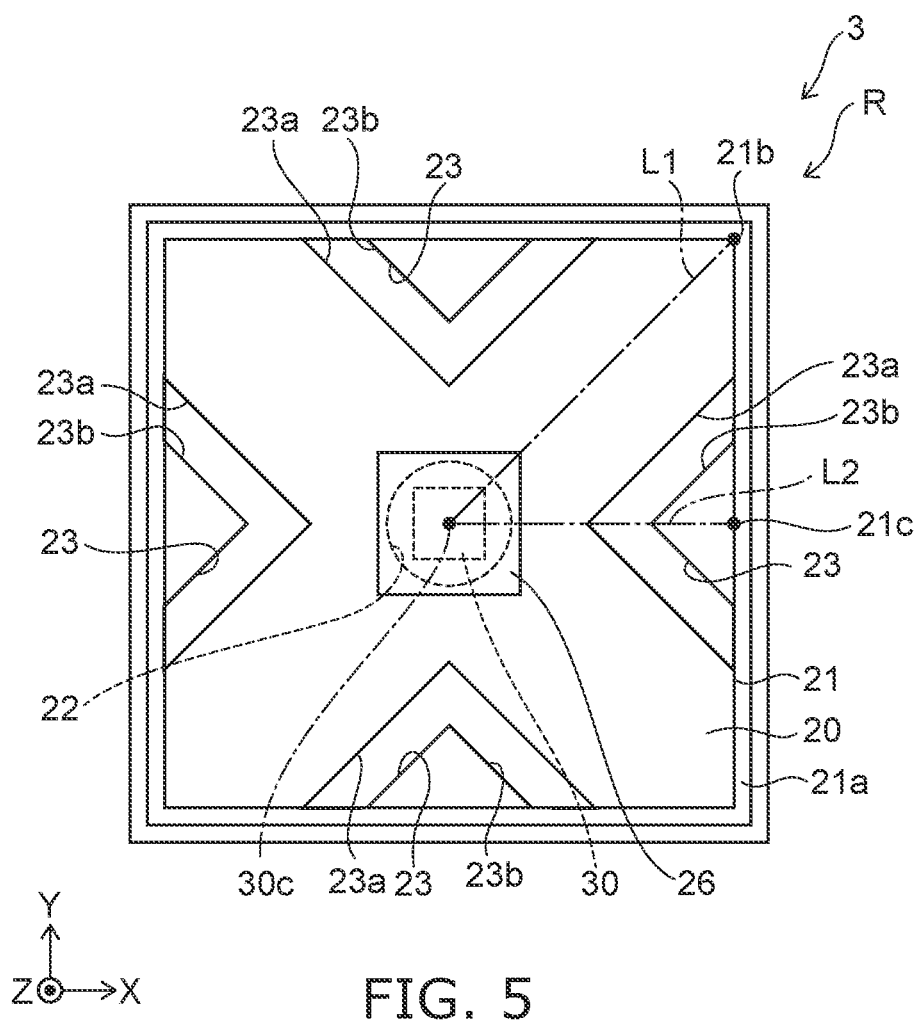

FIG. 5 is a top view of an emission region of a planar light source according to the present embodiment.

As shown in FIG. 5, in the planar light source 3 according to the present embodiment, the first lateral face 23a and the second lateral face 23b of each light adjusting hole 23 are in contact with the corresponding sectioning groove 21. The first lateral face 23a of each light adjusting hole 23 is positioned apart from the light source placement part 22. This can also achieve a similar effect to that achieved by the first embodiment. In the present embodiment, in particular, the light adjusting holes 23 positioned near the sectioning groove 21 can increase the amount of the light from the light source 30 that is totally reflected towards the corners and the vicinities of the corners of the emission region R. The other elements not described above, the operation, and the effect of the present embodiment are similar to those of the first embodiment.

As illustrated with reference to the second and third embodiments, the ratio of the distance between the light source placement part 22 and a light adjusting hole 23 to the distance between the light adjusting hole 23 and the sectioning groove 21 can be adjusted in accordance with desired light distribution characteristics. The light adjusting hole 23 can be disposed in the central area between the light source placement part 22 and the sectioning groove 21, can be closer to the light source placement part 22 or the sectioning groove 21, or in contact with either or both of the light source placement part 22 and the sectioning groove 21.

Fourth Embodiment

A fourth embodiment will be explained next.

Figure 6:
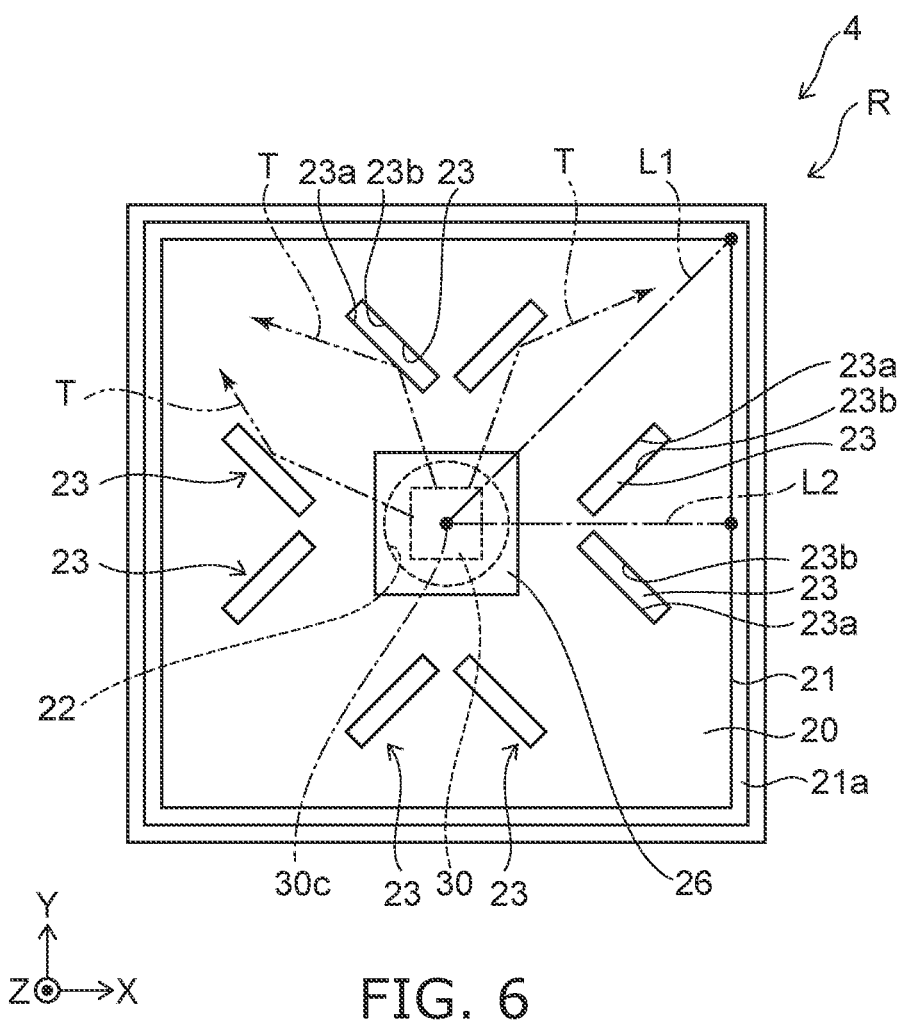

FIG. 6 is a top view of an emission region of a planar light source according to the present embodiment.

As shown in FIG. 6, in the planar light source 4 according to the present embodiment, the shape of each light adjusting hole 23 is a strip when viewed from above. The light adjusting holes 23 are arranged in the positions and orientations such that at least a portion of the light emitted from the light source 30 is totally reflected by the first lateral faces 23a to advance towards the corners of the emission region R. For example, the first lateral faces 23a of the light adjusting holes 23 are oblique to the X direction and the Y direction.

Furthermore, the light adjusting holes 23 are not disposed on any second straight line L2, but are each disposed in a region surrounded by a first straight line L1, a second straight line L2, and the sectioning groove 21. For example, a pair of adjacent light adjusting holes 23 interposing a second straight line L2 is positioned to have line symmetry using the second straight line L2 as the axis of symmetry. This allows the light adjusting holes to totally reflect the light from the light source 30 towards the corners of the emission region R while allowing a portion of the light from the light source 30 to propagate along the second straight lines L2, thereby preventing the regions surrounded by the second lateral faces 23b of the light adjusting holes 23 and the sectioning groove 21 from becoming excessively dark. Furthermore, a pair of adjacent light adjusting holes 23 interposing a first straight line L1 is positioned to have line symmetry using the first straight line L1 as the axis of symmetry. The other elements not described above, the operation, and the effect of the present embodiment are similar to those of the first embodiment.

Fifth Embodiment

A fifth embodiment will be explained next.

Figure 7:
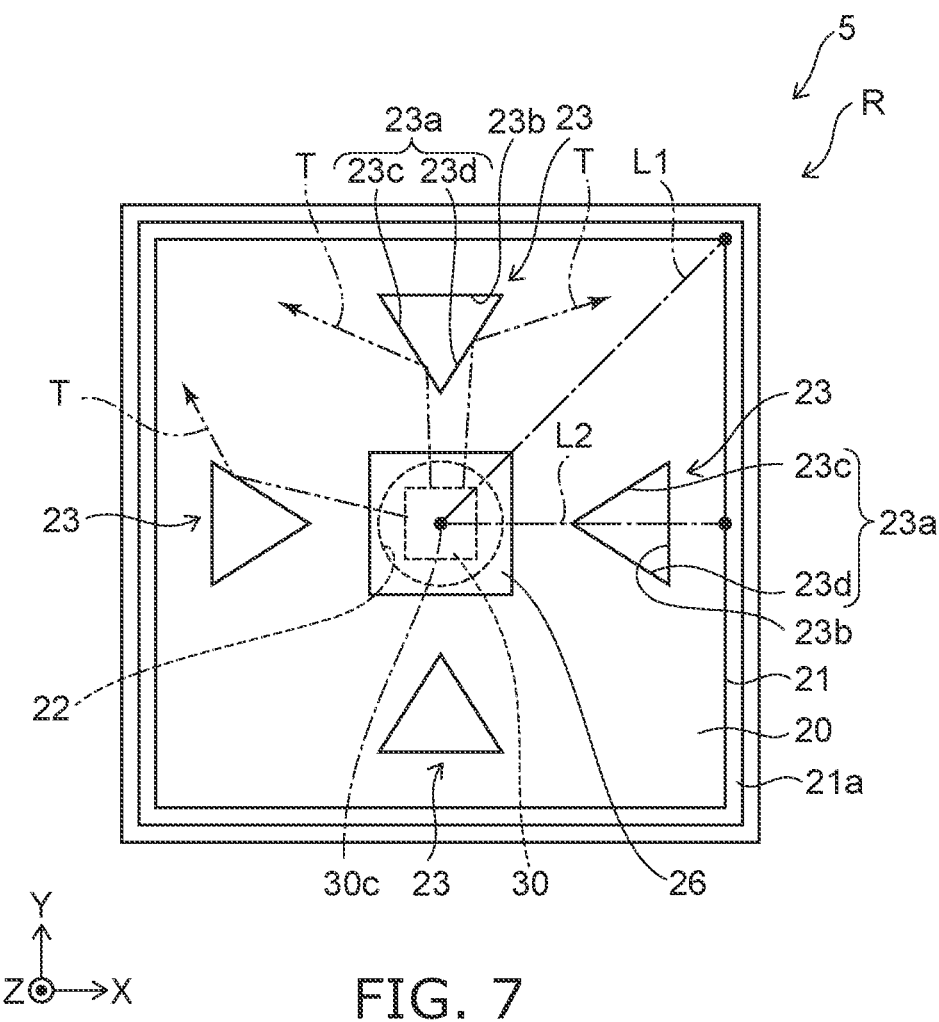

FIG. 7 is a top view of an emission region of a planar light source according to the present embodiment.

As shown in FIG. 7, in the planar light source 5 according to the present embodiment, the shape of each light adjusting hole 23 when viewed from above is triangular. In other words, the first region 23c, the second region 23d, and the second lateral face 23b of each light adjusting hole 23 form a triangle. The light adjusting holes 23 are positioned apart from the first straight lines L1, and intersect with the second straight lines L2. Similar to the first embodiment, the inside of each light adjusting hole 23 can be an air layer, or include a light transmissive material, or light reflecting material provided therein. The other elements not described above, the operation, and the effect of the present embodiment are similar to those of the first embodiment.

Sixth Embodiment

A sixth embodiment will be explained next.

Figure 8:
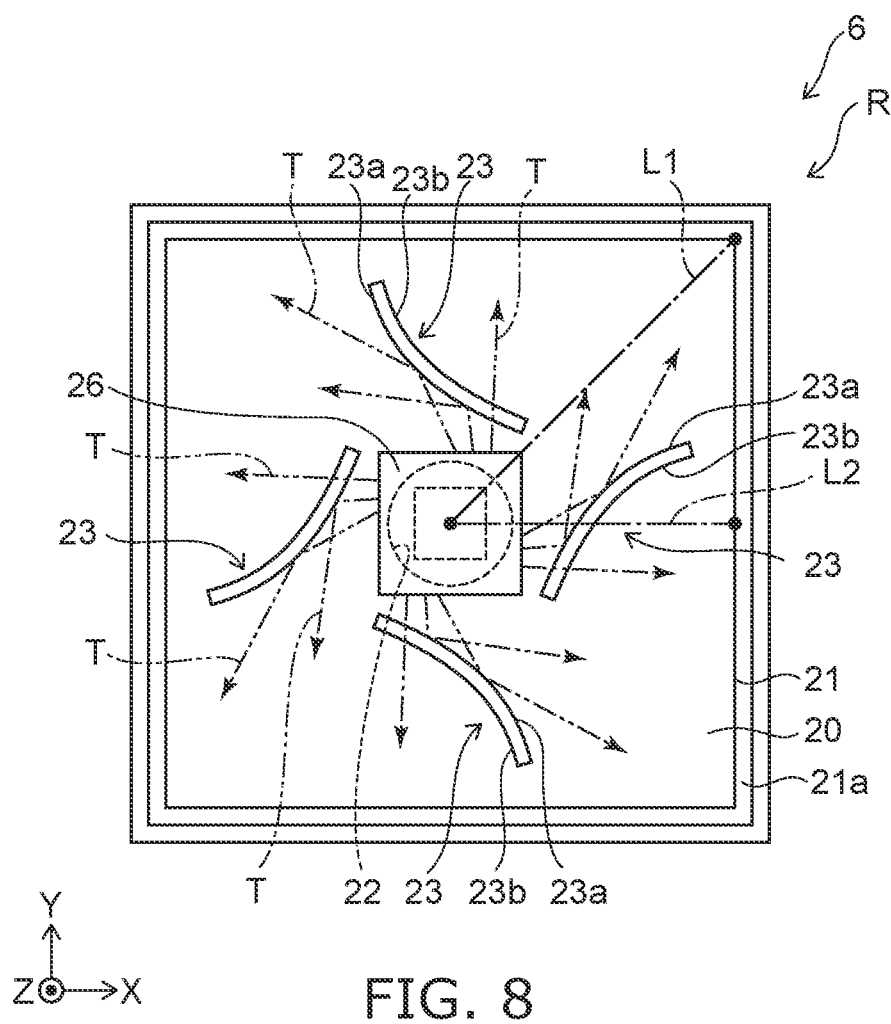

FIG. 8 is a top view of emission region of a planar light source according to the embodiment.

As shown in FIG. 8, in the planar light source 6 according to the present embodiment, each first lateral face 23a is convex-shaped, curved so as to outwardly protrude from the light adjusting hole 23. For example, the first lateral face 23a is curved, protruding towards the light source 30. The curvature of such a first lateral face 23a, for example, is preferably 0.08 to 0.35, more preferably 0.1 to 0.2. Each light adjusting hole 23 does not have line symmetrical shape using the second straight line L2 as the axis of symmetry. However, each light adjusting hole 23 can have line symmetrical shape using the second straight line L2 as the axis of symmetry.

The portion of the light emitted from the light source 30 that entered the first lateral face 23a of each light adjusting holes 23 at a smaller angle of incidence than the critical angle passes through the light adjusting hole 23, while allowing the light that entered the first lateral face 23a at a larger angle of incidence than the critical angle to be totally reflected by the first lateral face 23a to advance towards a corner of the emission region R. At this point, the curved first lateral faces 23a that protrude towards the light source 30 can diffuse the totally reflected light.

In the present embodiment, the light propagated along the second straight lines L2 can be totally reflected by the first lateral faces 23a of the light adjusting holes 23. Allowing a portion of the light reached the light adjusting holes 23 to pass through can prevent the regions behind the light adjusting holes 23 when viewed from the light source 30 from becoming excessively dark. The first lateral faces 23a that are curved to protrude towards the light source 30 can diffuse the light by way of total reflection. The other elements not described above, the operation, and the effect of the present embodiment are similar to those of the first embodiment.

Seventh Embodiment

A seventh embodiment will be explained next.

Figure 9:
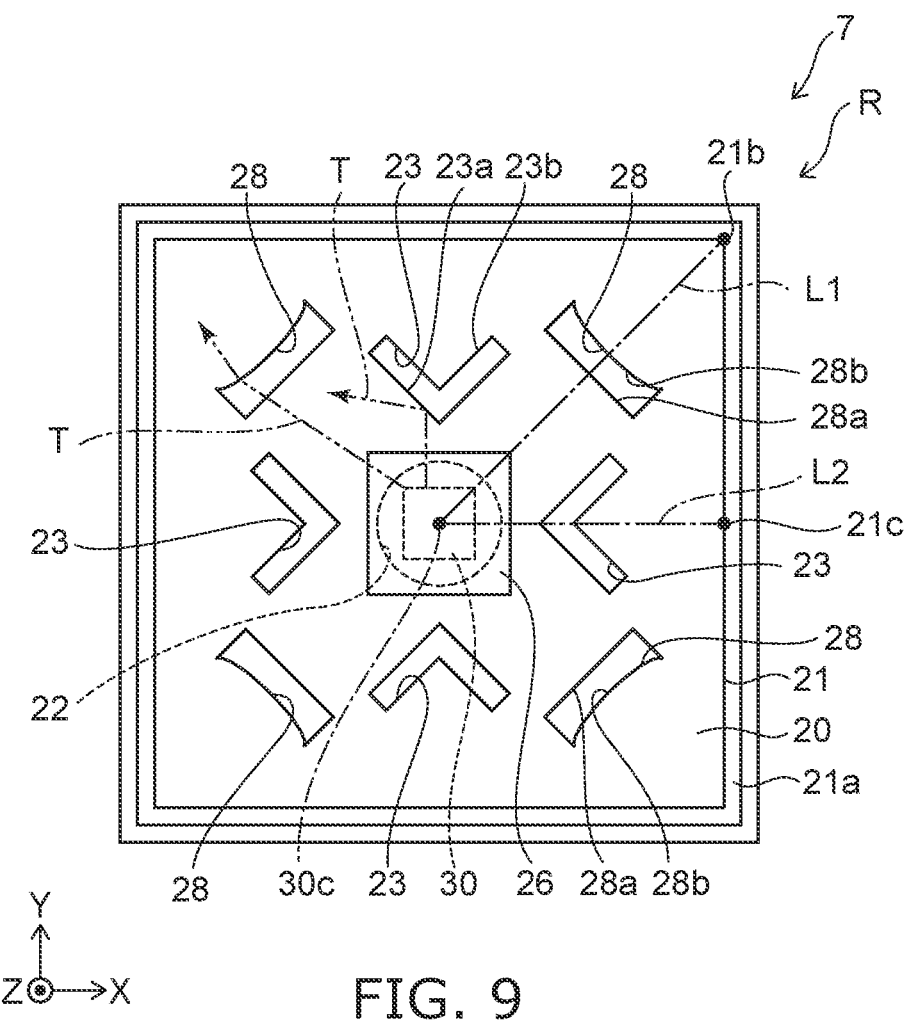

FIG. 9 is a top view of an emission region of a planar light source according to the present embodiment.

As shown in FIG. 9, in the planar light source 7 according to the present embodiment, in addition to the components of the planar light source 1 according to the first embodiment, light adjusting holes 28 are formed at the upper face 20a of the light guide member 20. The refractive index of the inside of each light adjusting hole 28 is lower than the refractive index of the light guide member 20. The inside of each light adjusting hole 28, for example, is an air layer. When viewed from above, the light adjusting holes 28 are positioned to intersect with the first straight lines L1. Furthermore, each light adjusting hole 28 has a shape of a concave lens when viewed from above.

For example, when viewed from above, each light adjusting hole 28 can have a shape of a plano-concave lens. In the example shown in FIG. 9, the first lateral face 28a of each light adjusting hole 28 positioned closer to the light source 30 is flat-shaped, and the second lateral face 28b positioned closer to a corner of the emission region R is concave-shaped, i.e., curved inward of the light adjusting holes 28. Conversely, the first lateral face 28a can be concave-shaped, i.e., curved inward of the light adjusting hole 28, and the second lateral face 28b flat. Alternatively, when viewed from above, each light adjusting hole 28 can have a biconcave lens shape. In other words, both the first lateral face 28a and the second lateral face 28b of each light adjusting hole 28 can be concave-shaped, i.e., curved inward of the light adjusting hole 28.

Furthermore, each light adjusting hole 28 can have a shape of a concave meniscus lens. In other words, the first lateral face 28a can be convex-shaped, curved outward so as to protrude towards the light source 30, and the second lateral face 28b concave-shaped, curved inward of the light adjusting hole 28. In this case, the curvature of the first lateral face 28a is smaller than the curvature of the second lateral face 28b. Conversely, the second lateral face 28a can be convex-shaped, curved outward towards a corner of the emission region R, and the first lateral face 28a concave-shaped, curved inward of the light adjusting hole 28. In this case, the curvature of the second lateral face 28b is smaller than the curvature of the first lateral face 28a.

In the present embodiment, at least one portion of the light emitted from the light source 30 that has reached the light adjusting holes 23 is totally reflected by the first lateral faces 23a of the light adjusting holes 23. This allows a portion of the light that has propagated near the second straight lines L2 to advance towards the first straight lines L1.

On the other hand, at least one portion of the light emitted from the light source 30 that has reached the light adjusting holes 28 is refracted as it passes through the light adjusting holes 28. At this time, because the refractive index of the inside of each light adjusting hole 28 is lower than the refractive index of the light guide member 20, and the light adjusting holes 28 each have a concave lens shape, an optical action similar to that of a regular convex lens results, thereby converging the light that has passed through the light adjusting holes 28. In this manner, the light passed through the light adjusting holes 28 is converged towards the farthest points 21b in the sectioning groove 21 that is farthest from the center 30c of the light source 30.

In this manner, the luminance in the corners of the emission region R can be further increased, and luminance non-uniformity in the emission region R can be further reduced. The other elements not described above, the operation, and the effect of the present embodiment are similar to those of the first embodiment.

Eighth Embodiment

An eighth embodiment will be explained next.

Figure 10:
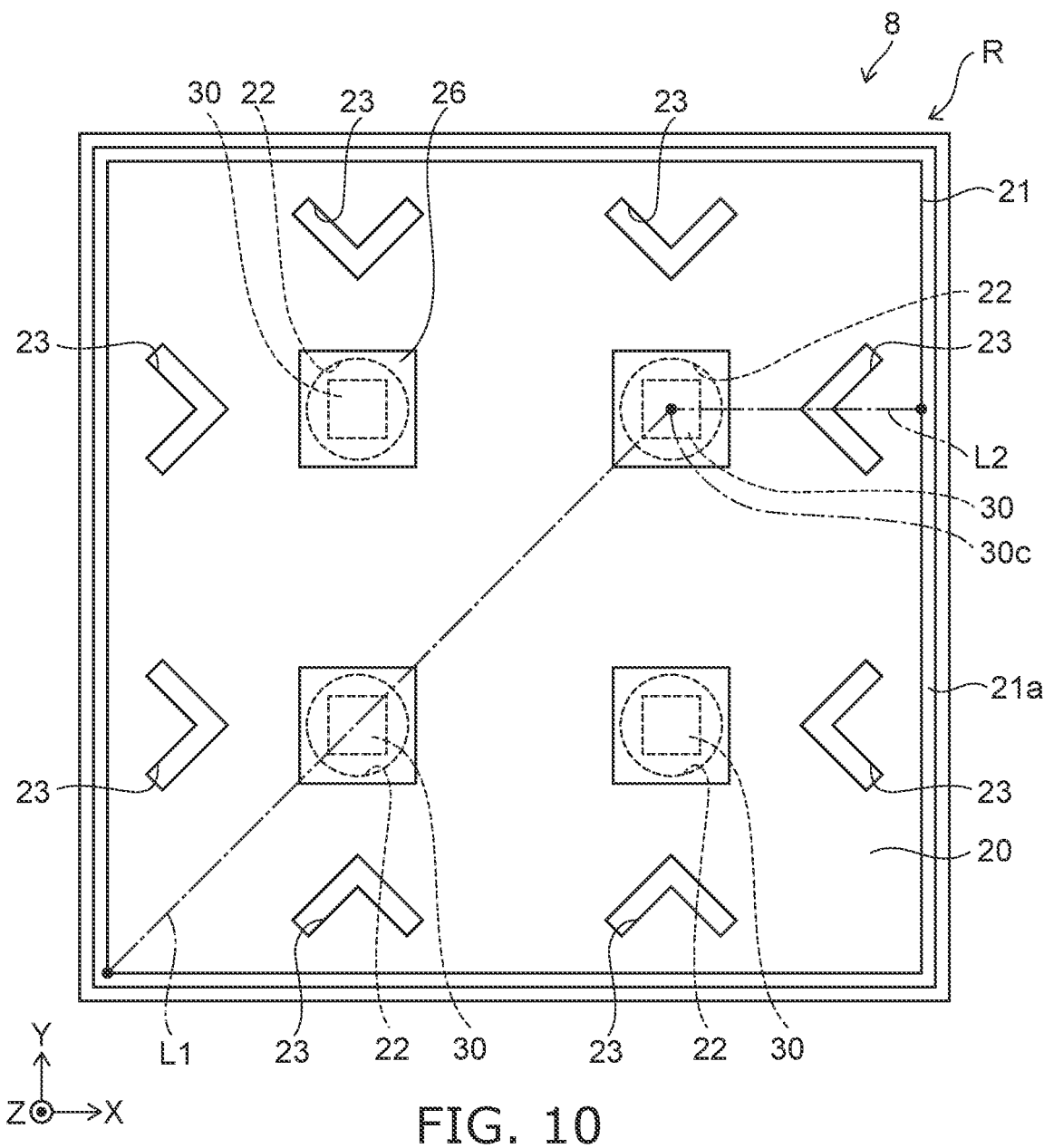

FIG. 10 is a top view of an emission region of a planar light source according to the present embodiment.

As shown in FIG. 10, in the planar light source 8 according to the present embodiment, a plurality of light sources 30 are disposed in each emission region R. In the example shown in FIG. 10, four light sources 30 are disposed in each emission region R, and arranged in a matrix of two rows by two columns along the X and Y directions. In the planar light source 8, four light source placement parts 22 are formed on the lower face of the light guide member 20, and each light source placement part 22 is provided with a light source 30.

Moreover, eight light adjusting holes 23 are formed at the upper face 20a of the light guide member 20. The light adjusting holes 23 are not positioned on any first straight line L1 that connects the center 30c of a light source 30 and the farthest point 21b in the sectioning groove 21 that is farthest from the center 30c. The light adjusting holes 23 can be positioned on the second lines L2 connecting the center 30c and the closest points 21c in the sectioning groove 21 that is closest from the center 30c. As shown in FIG. 10, it is preferable not to position any light adjusting hole 23 between the light source placement parts 22.

According to the present embodiment, disposing a plurality of light sources 30 in each emission region R can further reduce luminance non-uniformity in each emission region R. The other elements not described above, the operation, and the effect of the present embodiment are similar to those of the first embodiment.

Variations common to the embodiments described above will be explained below.

The first to fifth variations described below are variations related to the shapes of the sectioning grooves 21, the light source placement parts 22, and the light adjusting holes 23 in the up-down direction. The sixth variation is an example in which a wiring substrate 200 is not disposed. The seventh to twelfth variations are variations related to the light sources 30. The drawings showing the variations below are schematic, in which certain elements might be omitted or simplified as appropriate. The embodiments described above and the variations described below can be implemented in combination.

First Variation

Figure 11:
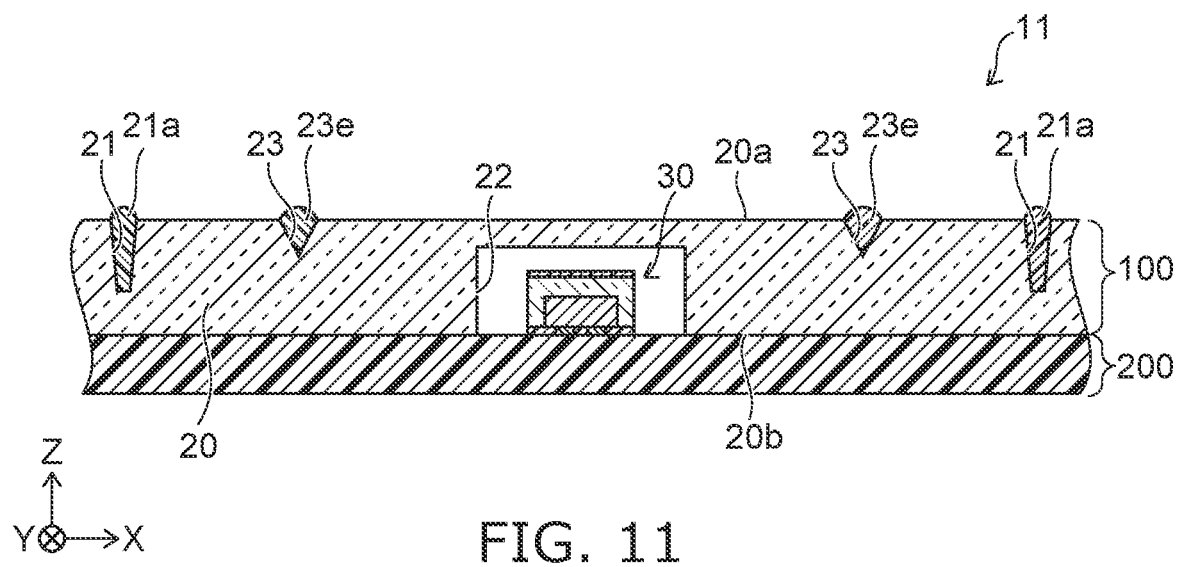

FIG. 11 is a cross-sectional view of a planar light source according to a first variation.

As shown in FIG. 11, in the planar light source 11 of this variation, the sectioning groove 21 and the light adjusting holes 23 are formed on the upper face 20a side of the light guide member 20. In other words, the sectioning groove 21 and the light adjusting holes 23 reach the upper face 20a of the light guide member 20, but are positioned apart from the lower face 20b.

The sectioning groove 21 is filled with a sectioning member 21a containing a light reflecting material, and the inside of the sectioning groove 21 is entirely buried under the sectioning member 21a. The light adjusting holes 23 are filled with an optical member 23e containing a light transmissive material or light reflecting material, and the inside of each light adjusting hole 23 is entirely buried under the optical member 23e. The upper edge of the sectioning member 21a and the upper edges of the optical members 23e are positioned higher than the upper face 20a of the light guide member 20. The light source positing part 22 is a recessed part formed on the lower face 20b of the light guide member 20. The light source placement part 22 can be entirely or partially filled with a first light transmissive member 25, or can be an air layer. In this example, both the sectioning groove 21 and the light adjusting holes 23 are illustrated such that the distance between the inner lateral faces of each sectioning groove 21 and the distance between the inner lateral faces of each light adjusting hole 23 increase towards the top, however, the configurations are not limited thereto. The distance between the inner lateral faces of each sectioning groove 21 and the distance between the inner lateral faces of each light adjusting hole 23 can be increased towards the bottom, or remain substantially parallel in the Z direction.

Second Variation

Figure 12:
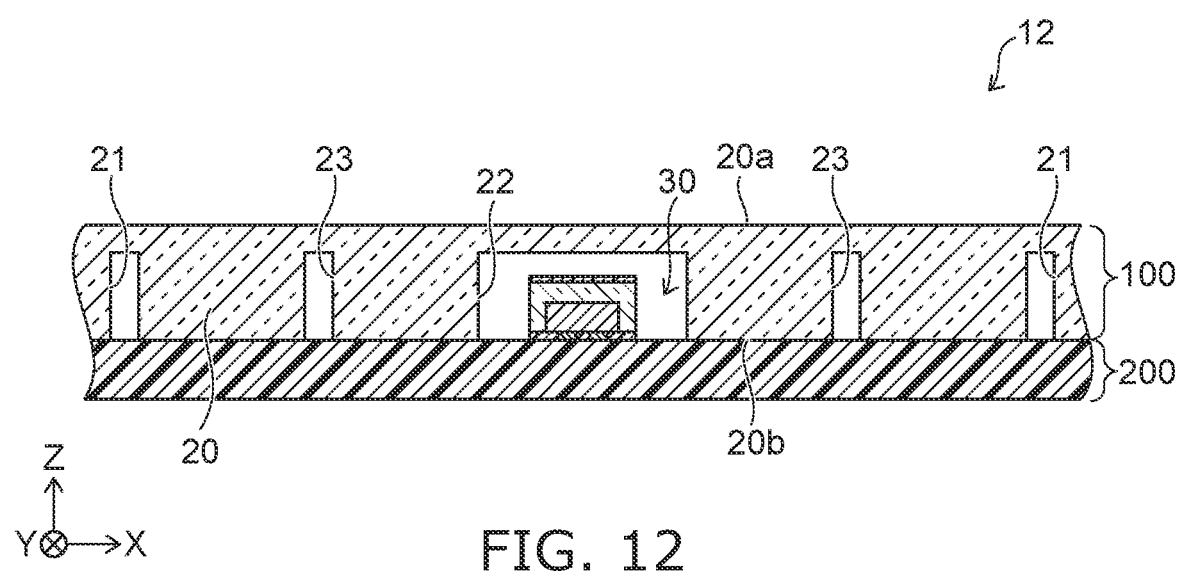

FIG. 12 is a cross-sectional view of a planar light source according to a second variation.

As shown in FIG. 12, in the planar light source 12 of this variation, the sectioning groove 21 and the light adjusting holes 23 are formed on the lower face 20b of the light guide member 20. In other words, the sectioning groove 21 and the light adjusting holes 23 are positioned apart from the upper face 20a of the light guide member 20, but reach the lower face 20b. The inside of the sectioning groove 21 and the light adjusting holes 23 are air layers. The light source placement part 22 is a recessed part formed on the lower face 20b of the light guide member 20. The light source placement part 22 can be entirely or partially filled with a first light transmissive member 25, or can be an air layer. FIG. 12 shows an example in which the inner lateral faces of each sectioning groove 21 and each light adjusting hole 23 are substantially parallel in the Z direction, however the configurations are not limited thereto. The distance between the inner lateral faces of each sectioning groove 21 and the distance between the inner lateral faces of each light adjusting hole 23 can be increased towards the top or bottom.

Third Variation

Figure 13:
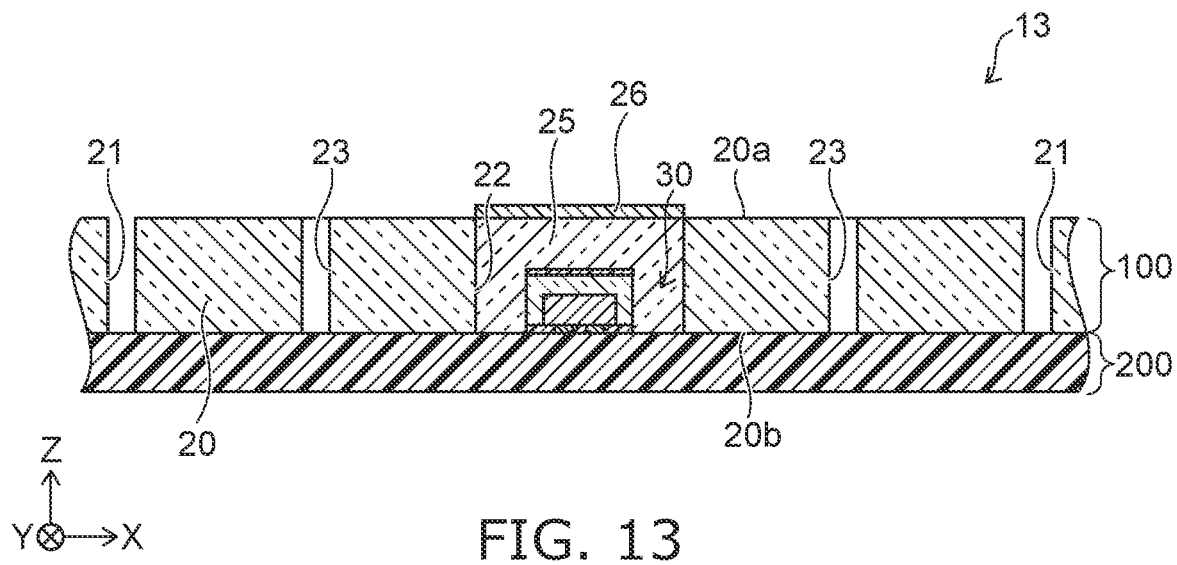

FIG. 13 is a cross-sectional view of a planar light source according to a third variation.

As shown in FIG. 13, in the planar light source 13 of this variation, the sectioning groove 21 and the light adjusting holes 23 pass through the light guide member 20 in the up-down direction (Z direction). In other words, the sectioning groove 21 and the light adjusting holes 23 reach both the upper face 20a and the lower face 20b of the light guide member 20. The inside of the sectioning groove 21 and the inside of the light adjusting holes 23 are air layers. The sectioning groove 21 and the light adjusting holes 23 can be partially closed. The light source placement part 22 also passes through the light guide member 20 in the up-down direction (Z direction). A first light transmissive member 25 is provided in the light source placement part 22. On the first light transmissive member 25, a first light adjusting member 26 is disposed. The first light transmissive member 25 and the first light adjusting member 26 do not have to be provided, or only the first light transmissive member 25 can be provided without providing the first light adjusting member 26. FIG. 13 shows an example in which the inner lateral faces of each sectioning groove 21 and the inner lateral faces of each light adjusting hole 23 that pass through the light guide member 20 are substantially parallel in the Z direction, however, the configurations are not limited thereto. The distance between the inner lateral faces of each sectioning groove 21 and the distance between the inner lateral faces of each light adjusting hole 23 can be increased towards the top, or can be increased toward the bottom.

Fourth Variation

Figure 14:
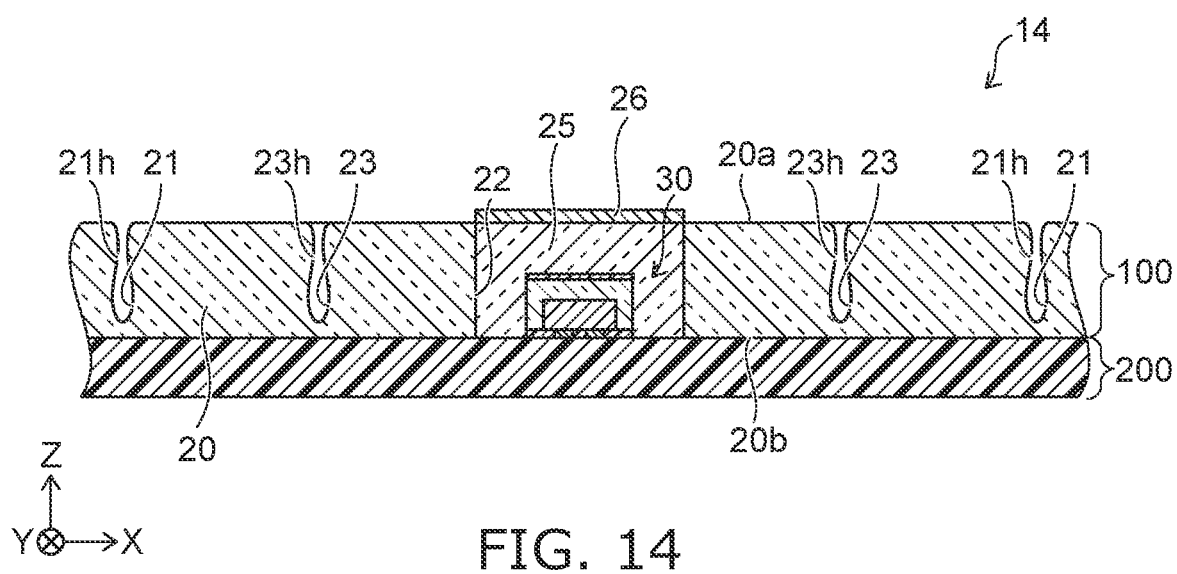

FIG. 14 is a cross-sectional view of a planar light source according to a fourth variation.

As shown in FIG. 14, in the planar light source 14 of this variation, the sectioning groove 21 and the light adjusting holes 23 are formed on the upper face 20a of the light guide member 20. Furthermore, one portion of the sectioning groove 21 in the Z direction is closed to form a closed portion 21h. One portion of each light adjusting hole 23 in the Z direction is closed to form a closed portion 23h. In the closed portions 21h and 23h, the lateral faces of the groove or hole are in contact, or the distance between the lateral faces of the grove or hole is smaller than the remaining portion.

Only one or the other of the closed portion 21h and the closed portions 23h can be formed. Moreover, the closed portion 21h can be formed across the entire lengths, or only in certain portion(s) of the lengths, in the directions in which the sectioning groove 21 is elongated (i.e., the X and Y directions). Similarly, the closed portion 23h can be formed across the entire length, or only in certain portion(s) of the length, in the direction in which a light adjusting hole 23 extends (i.e., the direction parallel to the X-Y plane). Furthermore, the position of a closed portion 21h or 23h in the Z direction can be appropriately determined.

Fifth Variation

Figure 15:
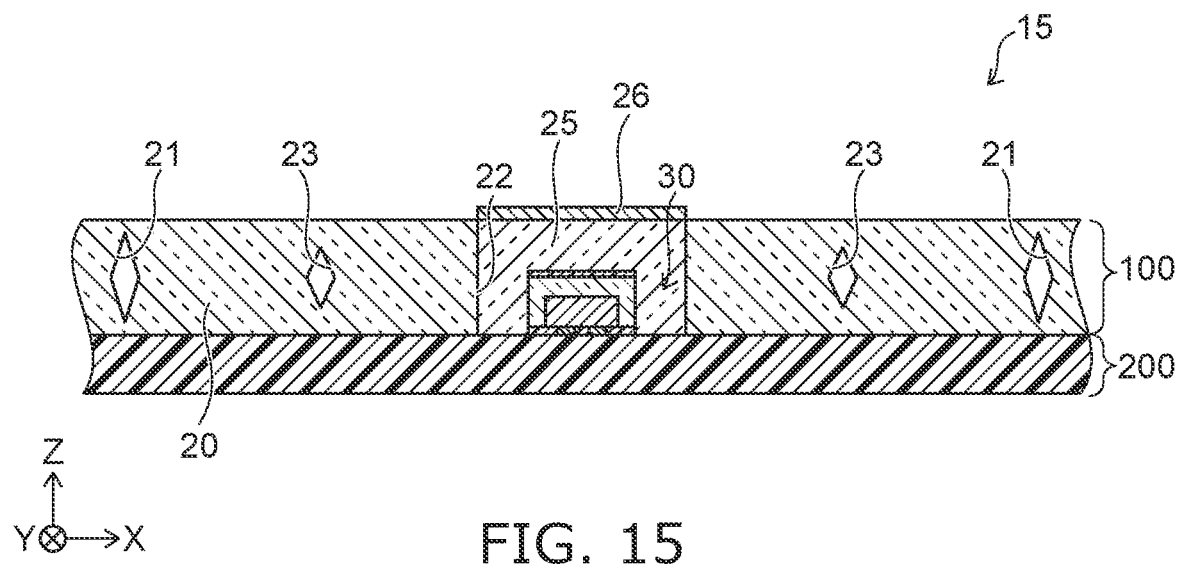

FIG. 15 is a cross-sectional view of a planar light source according to a fifth variation.

As shown in FIG. 15, in the planar light source 15 of this variation, the sectioning groove 21 and the light adjusting holes 23 are formed in the light guide member 20. In other words, the sectioning grove 21 and the light adjusting holes 23 are positioned apart from both the upper face 20a and the lower face 20b of the light guide member 20. The inside of the sectioning groove 21 and the inside of the light adjusting holes 23 are air layers. The light source placement part 22 passes through the light guide member 20 in the up-down direction (Z direction).

Such a light guide member 20 can include a lower light guide plate and an upper light guide plate. The upper face of the lower light guide plate is provided with a recessed part that will become the lower portion of the sectioning groove 21, recessed parts that will become the lower portions of the light adjusting holes 23, and a through hole that will become the lower portion of the light source placement part 22. The lower face of the upper light guide plate is provided with a recessed part that will become the upper portion of the sectioning groove 21, recessed parts that will become the upper portions of the light adjusting holes 23, and a through hole that will become the upper portion of the light source placement part 22. Such a light guide member 20 can be formed by adhering a lower light guide plate and an upper light guide plate together. A first light transmissive member 25 entirely or partially fills the light source placement part 22. On the first light transmissive member 25, a first light adjusting member 26 is provided.

Sixth Variation

Figure 16:
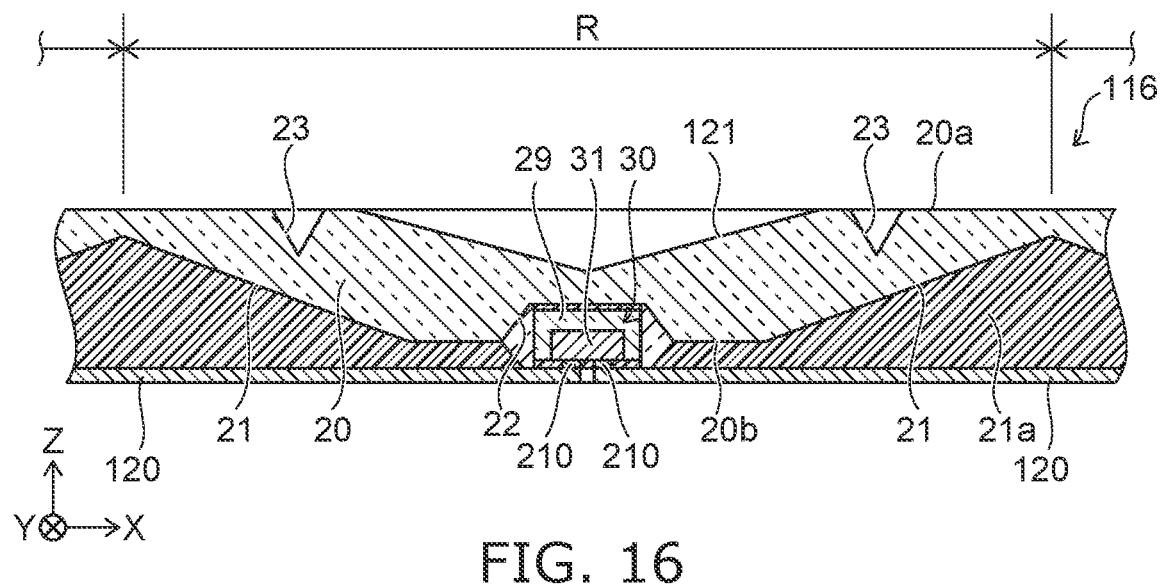

FIG. 16 is a cross-sectional view of a light emitting module according to a sixth variation.

As shown in FIG. 16, in the light emitting module 116 of this variation, no wiring substrate 200 is provided. In the light guide member 20, the light source placement part 22 is a recessed part formed on the lower face 20b of the light guide member 20. The light source 30 is disposed in the light source placement part 22, and an affixing member 29 is provide in the space between the light source 30 and the light guide member 20 in the light source placement part 22. The affixing member 29, for example, is formed of a light transmissive resin material. The light source 30 is fixed to the light guide member 20 via the affixing member 29.

The sectioning groove 21 is formed on the lower face 20b of the light guide member and a sectioning member 21a is provided inside thereof. The sectioning member 21a reaches the light source placement part 22. A pair of wirings 120 is disposed on the lower face of the sectioning member 21a. The pair of wirings 120 is electrically connected to the pair of positive and negative electrodes of the light emitting element 31 of the light source 30 via a pair of external electrode members 210. The light adjusting holes 23 are formed at the upper face of the light guide member 20. A recessed part 121 is created in the region of the upper face of the light guide member 20, the region of the upper face 20a including the area immediately above the light source placement part 22. A first light adjusting member 26 can be provided in the recessed part 121, but does not have to be provided.

The light emitting module 116 of this variation constructs a planar light source by being mounted on an external substrate (not shown). Power is supplied to the light source 30 from the external substrate.

Seventh Variation

Figure 17A:
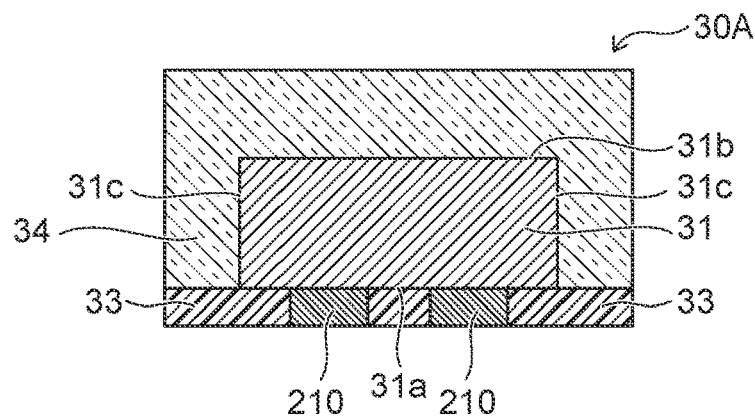

FIG. 17A is a cross-sectional view of a light source according to a seventh variation.

As shown in FIG. 17A, in the light source 30A of this variation, a light emitting element 31, a cover member 33, and a second light transmissive member 34 are provided. A pair of external electrode members 210 is connected to the pair of positive and negative electrodes disposed on the first face 31a of the light emitting element 31. The cover member 33 is disposed under the first face 31a of the light emitting element 31 around the external electrode members 210. The second light transmissive member 34 covers the lateral faces 31c and the second face 31b of the light emitting element 31. The second light transmissive member 34 can be a wavelength conversion layer containing a phosphor.

Eighth Variation

Figure 17B:
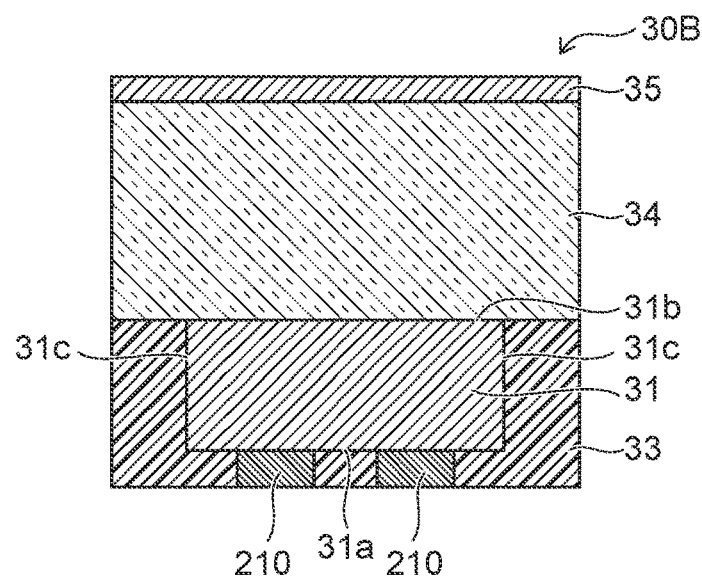

FIG. 17B is a cross-sectional view of a light source according to an eighth variation.

As shown in FIG. 17B, the light source 30B of this variation differs from the light source of the seventh variation in that the cover member 33 covers the lateral faces 31c of the light emitting element 31, the second light transmissive member 34 is disposed on the second face 31b of the light emitting element 31, and a second light adjusting member 35 is disposed on the second light transmissive member 34. In the case in which the transmittance of the second light adjusting member 35 is sufficiently low, the second light adjusting member 35 serves as a light shielding film.

Ninth Variation

Figure 17C:
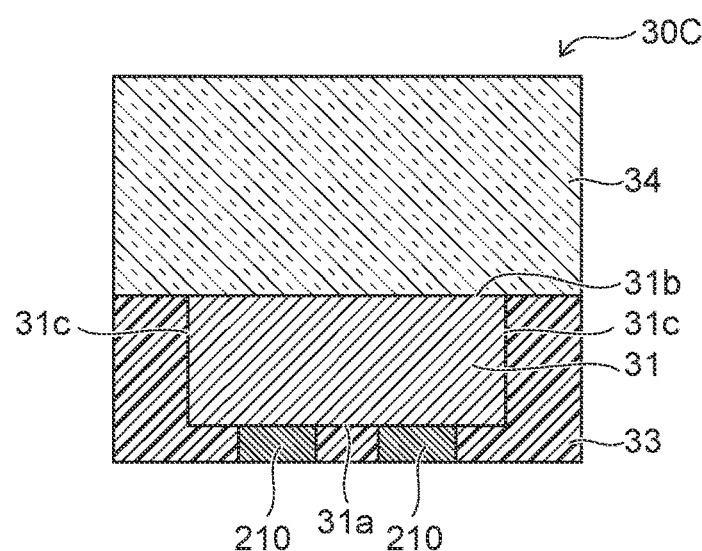

FIG. 17C is a cross-sectional view of a light source according to a ninth variation.

As shown in FIG. 17C, the light source 30C of this variation differs from the light source of the eighth variation in that no second light adjusting member 35 is provided.

Tenth Variation

Figure 18A:
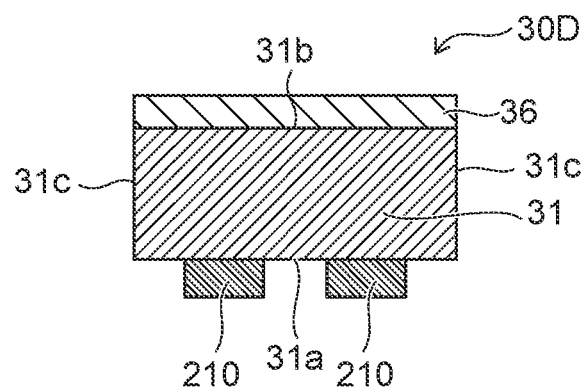

FIG. 18A is a cross-sectional view of a light source according to a tenth variation.

As shown in FIG. 18A, the light source 30D of this variation differs from the light source of the seventh variation in that it does not include any cover member 33 or second light transmissive member 34, but includes a light shielding layer 36. The light shielding layer 36 is disposed on the second face 31b of the light emitting element 31. The light shielding layer 36, for example, is a metal layer or a distributed Bragg reflector (DBR). The light shielding layer 36 can be formed of a resin containing a light diffusing material.

Eleventh Variation

Figure 18B:
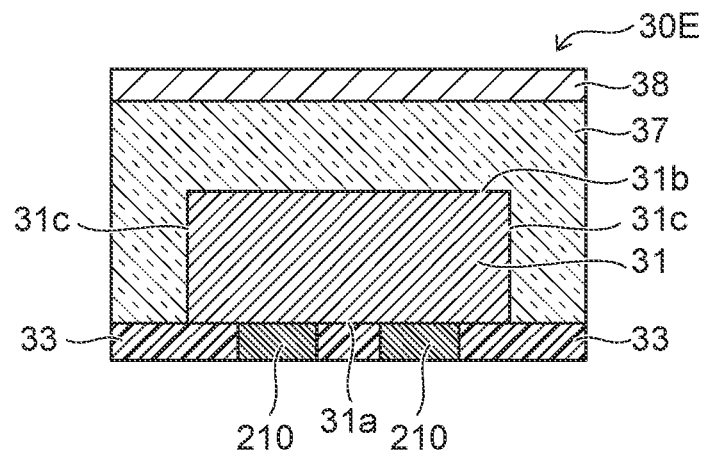

FIG. 18B is a cross-sectional view of a light source according to an eleventh variation.

As shown in FIG. 18B, the light source 30E of this variation differs from the light source of the seventh variation in that a light transmissive layer 37 is provided instead of the second light transmissive member 34, and a light shielding film 38 is further provided. The light transmissive layer 37, for example, is formed of a light transmissive resin layer. The light transmissive layer 37, for example, does not substantially contain a phosphor. The light transmissive layer 37 can contain a light diffusing material. The light shielding film 38 is disposed on the light transmissive layer 37. The light shielding film 38, for example, is a metal layer or a distributed Bragg reflector. The light shielding film 38 can be a resin containing a light diffusing material.

Twelfth Variation

Figure 18C:
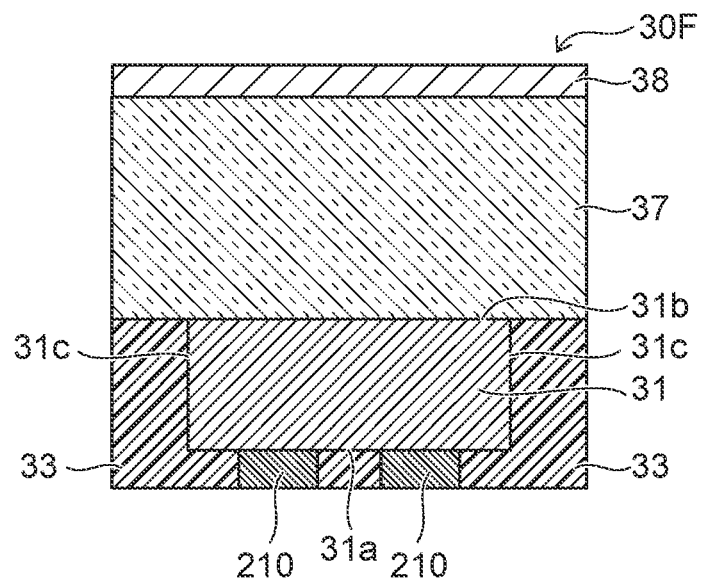

FIG. 18C is a cross-sectional view of a light source according to a twelfth variation.

As shown in FIG. 18C, the light source 30F of this variation differs from the light source 30E of the eleventh variation in that the cover member 33 covers the lateral faces 31c of the light emitting element 31, and the light transmissive layer 37 is disposed on the second face 31b of the light emitting element 31.

In the embodiments and the variations described in the foregoing, the light guide member 20 was illustrated as a plate-shaped member, but is not limited to this. The light guide member 20 can be a layer formed to cover the light sources 30. The light guide member 20 can have a multilayer structure body or as blocks provided per emission region R. Moreover, a light source 30 can have a plurality of light emitting elements. Furthermore, the shape of each emission region R is not limited to quadrilateral, and can be polygonal other than quadrilateral, such as triangular or hexagonal.

What is claimed is:

1. A light emitting module comprising:
   a light guide member comprising:
      an emission region defined by a sectioning groove,
      a light source placement part located in the emission region, and
      a light adjusting hole,
      wherein, in a schematic top view, the light adjusting hole is located between the sectioning groove and the light source placement part;
   a light source disposed in the light source placement part;
   a first light transmissive member comprising a light transmissive resin material, the first light transmissive member being provided in the light source placement part so as to embed the light source; and
   a first light adjusting member disposed on the light guide member, the first light adjusting member being located in a region including an area immediately above the light source placement part; wherein:

the light source comprises:
- a light emitting element having a first face, a second face located opposite to the first face, and a third face extending from the first face to the second face,
- a second light transmissive member covering the second face of the light emitting element and the third face of the light emitting element,
- a cover member including a light diffusing material, the cover member covering the first face of the light emitting element and a lower face of the second light transmissive member, and
- a second light adjusting member including a light reflecting material, the second light adjusting member being disposed on the second light transmissive member; and in the schematic top view:
- the light adjusting hole is not positioned on a first straight line connecting (i) a center of the light source and (ii) a point in the sectioning groove that is farthest from the center of the light source,
- the light adjusting hole has a first lateral face located on a side closer to the light source and a second lateral face located on a side opposite the first lateral face,
- the first lateral face has a first region, and
- a line normal to the first region is oblique to a second straight line connecting (i) the center of the light source and (ii) a point in the sectioning groove that is closest to the center of the light source.

2. The light emitting module according to claim 1, wherein:
- a refractive index of an inside of the light adjusting hole is lower than a refractive index of the light guide member, and
- the first region is configured to totally reflect light emitted from the light source.

3. The light emitting module according to claim 1, wherein an inside of the light adjusting hole is an air layer.

4. The light emitting module according to claim 1, wherein the light adjusting hole is positioned to intersect with the second straight line.

5. The light emitting module according to claim 1, wherein:
- the light guide member has at least one additional light adjusting hole, and
- in the schematic top view:
  - the emission region has a quadrilateral shape, and
  - the light adjusting hole and the additional light adjusting hole are provided at positions between the light source and sides of the emission region.

6. The light emitting module according to claim 1, wherein:
- in the schematic top view:
  - the first lateral face of the light adjusting hole further has a second region oblique to the first region, and
  - a line normal to the second region is oblique to the second straight line.

7. The light emitting module according to claim 6, wherein the second region is configured to totally reflect light emitted from the light source.

8. The light emitting module according to claim 6, wherein a direction in which the second region is oblique to the second straight line is opposite to a direction in which the first region is oblique to the second straight line.

9. The light emitting module according to claim 6, wherein, in the schematic top view, the first region, the second region, and the second lateral face of the light adjusting hole form a triangle.

10. The light emitting module according to claim 1, wherein, in the schematic top view, the first region is positioned in a region surrounded by the first straight line, the second straight line, and the sectioning groove.

11. The light emitting module according to claim 1, wherein, in the schematic top view, the first lateral face of the light adjusting hole is convex-shaped so as to be curved outward from the light adjusting hole.

12. The light emitting module according to claim 1, wherein the light adjusting hole reaches an upper face of the light guide member, but is positioned apart from a lower face of the light guide member.

13. The light emitting module according to claim 1, wherein the light adjusting hole passes through the light guide member from an upper face to a lower face of the light guide member.

14. The light emitting module according to claim 1, wherein the light adjusting member is configured to reflect a portion of the light emitted from the light sources and transmit a portion of the light emitted from the light source.

15. The light emitting module according to claim 1, wherein a pair of positive and negative electrodes are formed on the first face of the light emitting element.

16. The light emitting module according to claim 15, wherein the light emitting element further comprises a light shielding layer positioned on the second face.

17. The light emitting module according to claim 15, wherein:
the light source further comprises:
- a light transmissive layer positioned at least on the second face of the light emitting element, and
- a light shielding film disposed on the light transmissive layer.

18. The light emitting module according to claim 15, wherein the light source further comprises a wavelength conversion layer disposed at least on the second face of the light emitting element.

19. The light emitting module according to claim 18, wherein the light source further comprises a light shielding film disposed on the wavelength conversion layer.

20. A planar light source comprising:
the light emitting module according to claim 1, and
a wiring substrate; wherein:
the light guide member is disposed on the wiring substrate, and the light source is mounted on the wiring substrate.

21. A light emitting module comprising:
a light guide member comprising:
- an emission region defined by a sectioning groove,
- a light source placement part located in the emission region,
- a first light adjusting hole, and
- a second light adjusting hole,
- wherein, in a schematic top view, the first light adjusting hole and the second light adjusting hole are located between the sectioning groove and the light source placement part;
a light source disposed in the light source placement part;
a first light transmissive member comprising a light transmissive resin material, the first light transmissive member being provided in the light source placement part so as to embed the light source; and
a first light adjusting member disposed on the light guide member, the first light adjusting member being located in a region including an area immediately above the light source placement part; wherein:

the light source comprises:
- a light emitting element having a first face, a second face located opposite to the first face, and a third face extending from the first face to the second face,
- a second light transmissive member covering the second face of the light emitting element and the third face of the light emitting element,
- a cover member including a light diffusing material, the cover member covering the first face of the light emitting element and a lower face of the second light transmissive member, and
- a second light adjusting member including a light reflecting material, the second light adjusting member being disposed on the second light transmissive member; and a refractive index of an inside of the second light adjusting hole is lower than a refractive index of the light guide member, in the schematic top view:
- a shape of the emission region is quadrilateral,
- the first light adjusting hole is not positioned on a first straight line connecting a center of the light source and a corner of the emission region, wherein light emitted from the light source is totally reflected by a lateral face of the first light adjusting hole, and
- the second light adjusting hole is positioned at a region with which the first straight line intersects, wherein light emitted from the light source is refracted in the second light adjusting hole.

22. A light emitting module comprising:
a light guide member comprising:
- an emission region defined by a sectioning groove,
- a light source placement part located in the emission region, and
- a light adjusting hole, wherein, in a schematic top view, the light adjusting hole is located between the sectioning groove and the light source placement part;
a light source disposed in the light source placement part; and
a light adjusting member disposed on the light guide member, the light adjusting member being located in a region including an area immediately above the light source placement part, wherein:

the light source comprises:
- a light emitting element having a lower face, an upper face located opposite to the lower face, and a lateral face extending from the lower face to the upper face,
- a light transmissive member covering the upper face of the light emitting element and the lateral face of the light emitting element, and
- a cover member including a light diffusing material, the cover member covering the lower face of the light emitting element and a lower face of the light transmissive member; and in the schematic top view:
- the light adjusting hole is not positioned on a first straight line connecting (i) a center of the light source and (ii) a point in the sectioning groove that is farthest from the center of the light source,
- the light adjusting hole has a first lateral face located on a side closer to the light source and a second lateral face located on a side opposite the first lateral face,
- the first lateral face of the light adjusting hole has a first region, and
- a line normal to the first region is oblique to a second straight line connecting (i) the center of the light source and (ii) a point in the sectioning groove that is closest to the center of the light source.

* * * * *